(12) United States Patent
Kawakami et al.

(10) Patent No.: US 10,313,015 B2
(45) Date of Patent: Jun. 4, 2019

(54) OPTICAL TRANSMITTER AND BIAS VOLTAGE CONTROL METHOD

(71) Applicant: NIPPON TELEGRAPH AND TELEPHONE CORPORATION, Tokyo (JP)

(72) Inventors: Hiroto Kawakami, Yokosuka (JP); Shoichiro Kuwahara, Yokosuka (JP); Akira Hirano, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 15/774,897

(22) PCT Filed: Nov. 10, 2016

(86) PCT No.: PCT/JP2016/083372
§ 371 (c)(1),
(2) Date: May 9, 2018

(87) PCT Pub. No.: WO2017/082349
PCT Pub. Date: May 18, 2017

(65) Prior Publication Data
US 2018/0323878 A1    Nov. 8, 2018

(30) Foreign Application Priority Data

Nov. 12, 2015  (JP) ................................ 2015-222016
Aug. 17, 2016  (JP) ................................ 2016-160092

(51) Int. Cl.
| G02F 1/01 | (2006.01) |
| G02F 1/225 | (2006.01) |
| H04B 10/50 | (2013.01) |
| H04B 10/516 | (2013.01) |

(52) U.S. Cl.
CPC ..... *H04B 10/50575* (2013.01); *G02F 1/0123* (2013.01); *G02F 1/225* (2013.01); *H04B 10/516* (2013.01)

(58) Field of Classification Search
CPC .............................. H04B 10/50575–10/50577
See application file for complete search history.

(56) References Cited

U.S. PATENT DOCUMENTS

| 2008/0187324 A1 | 8/2008 | Akiyama et al. |
| 2012/0308240 A1 | 12/2012 | Akiyama |
| 2016/0156416 A1 | 6/2016 | Shirakawa |

FOREIGN PATENT DOCUMENTS

| JP | 2004-301965 A | 10/2004 |
| JP | 2008-197639 A | 8/2008 |

(Continued)

OTHER PUBLICATIONS

Hiroto Kawakami et al., "Auto bias control technique for optical 16-QAM transmitter with asymmetric bias dithering", Optics Express, Nov.-Dec. 2011, vol. 19, No. 26, pp. B308-B312.

(Continued)

*Primary Examiner* — Casey L Kretzer
(74) *Attorney, Agent, or Firm* — Harness, Dickey & Pierce, P.L.C.

(57) ABSTRACT

An optical transmitter includes: an optical modulator including an MZ interferometer, a drive signal input electrode, and a phase difference adjustment bias electrode; a drive amplifier; a phase difference adjustment bias voltage generator; a dithering unit that applies dithering of a predetermined frequency to an amplitude of a drive signal or to a half-wave voltage of the MZ interferometer; a controller unit that changes a phase difference adjustment bias voltage based on a modulation component of the frequency that is superimposed onto modulated light that is output from the optical modulator, to thereby bias the MZ interferometer to a null (Continued)

point; and a synchronous detection circuit that synchronously detects the modulation component of the frequency that is superimposed onto the modulated light. The controller unit changes the phase difference adjustment bias voltage such that a result of synchronous detection by the synchronous detection circuit becomes maximized or minimized. Whether the controller unit maximizes or minimizes the result of synchronous detection is determined by a difference between a phase of a referenced clock signal and a phase of the dithering, and does not depend on the amplitude of the drive signal.

11 Claims, 14 Drawing Sheets

(56) References Cited

FOREIGN PATENT DOCUMENTS

| JP | 2011-043575 | A | 3/2011 |
|----|-------------|---|--------|
| JP | 2012-217127 | A | 11/2012 |
| JP | 2012-247712 | A | 12/2012 |
| JP | 2012-257164 | A | 12/2012 |
| JP | 2013-174761 | A | 9/2013 |
| JP | 2014-010188 | A | 1/2014 |
| JP | 2014-010189 | A | 1/2014 |
| JP | 5671130 | B1 | 12/2014 |
| JP | 2016-102870 | A | 6/2016 |
| WO | WO-2015/156394 | A1 | 10/2015 |

OTHER PUBLICATIONS

Hiroto Kawakami et al., Drive-amplitude-independent Auto Bias Control Circuit for QAM Signals and Its Demonstration with an InP-based IQ Modulator, Program for European Conference on Optical Communication (ECOC2016), Jul. 19, 2016, p. 47 W.4.P1. SC4.35.

International Search Report for PCT/JP2016/083372, ISA/JP, Tokyo, dated Feb. 7, 2017, with English translation thereof.

Japanese Office Action for JPSN 2017550389, dated Feb. 12, 2019.

PRIOR ART

OPTICAL TRANSMITTER AND BIAS VOLTAGE CONTROL METHOD

CROSS-REFERENCE TO RELATED APPLICATIONS

This application is a 371 U.S. National Stage of International Application No. PCT/JP2016/083372, filed Nov. 10, 2016, which claims the benefit of and priority to Japanese Patent Applications Nos. 2015-222016, filed on Nov. 12, 2015 and 2016-160092, filed on Aug. 17, 2016. The disclosures of the above applications are incorporated herein by reference.

TECHNICAL FIELD

The present invention relates to an optical transmitter and a bias voltage control method.

Priority is claimed on Japanese Patent Application No. 2015-222016, filed Nov. 12, 2015, and Japanese Patent Application No. 2016-160092, filed Aug. 17, 2016, the content of which is incorporated herein by reference.

BACKGROUND ART

Optical modulators that modulate the intensity and optical phase of a CW (Continuous Wave) light (also referred to as a continuous light below) are widely used as means for generating the optical signals used in optical transmitters. Several types of optical modulators exist. High-speed modulation of an optical signal generally uses an MZ optical modulator configured by an MZ (Mach-Zehnder) interferometer. Hereunder, in the present specification, an optical modulator refers to an MZ optical modulator unless otherwise specified. An optical modulator having a basic configuration includes an optical input terminal for inputting a CW light source, an optical output terminal for outputting a modulated signal, and a drive signal input terminal for inputting an electric data signal. In an optical modulator in an ideal state, a light intensity modulation signal or an optical phase modulation signal that correspond to an RF (Radio Frequency) drive signal input to the drive signal input terminal, is output from the optical output terminal.

In an actual optical modulator, the quality of an optical signal output from the optical output terminal may deteriorate with time due to temperature fluctuations or other reasons. For example, when an optical modulator is driven, a DC (Direct Current) bias voltage is usually applied to adjust an optical phase difference of the MZ interferometer provided in the optical modulator to an appropriate value. The optimal value of the bias voltage varies with time. This phenomenon is referred to as bias drift. In optical modulators using $LiNbO_3$, if the bias drift is not calibrated, the optical signal deteriorates over several hours to an extent that demodulation is no longer possible. As a result, an in-service ABC (Auto Bias Control) is essential. In semiconductor optical modulators that use a change in the refractive index of the semiconductor, the bias drift is very small compared to optical modulators using $LiNbO_3$. However, the optimal value of the bias strongly depends on the wavelength and the temperature. Consequently, automatic control of the bias is still necessary at the time of start-up of the optical transmitter and end-of-life operation, that is, during continuous operation in the warranty period.

Here, an example of a configuration in which a drive voltage and a bias voltage are applied to a semiconductor optical modulator will be described. FIG. 14 is a block diagram showing a configuration of a conventional optical transmitter. In the optical transmitter 600 shown in FIG. 14, a CS-RZ (Carrier-Suppressed Return-to-Zero) modulated light is generated in a semiconductor optical modulator 1. CW light input from the semiconductor optical modulator 1 is supplied to an MZ interferometer 2. A differential output drive amplifier 3 receives a binary data signal, and amplifies it to generate drive signals $V_{data}$ and $-V_{data}$. The drive signals $\pm V_{data}$ symmetrically distribute to positive voltage and negative voltage centering on GND (ground) level, without including a DC component. A drive signal bias voltage $V_4$ generated by a drive signal bias voltage generator 4 is applied to the drive signals $\pm V_{data}$ by a bias adder 5a and a bias adder 5b. If the modulator drive signals $\pm V_{data} + V_4$ are each always positive or always negative, then the modulator drive signals are always a positive voltage or always a negative voltage, and the semiconductor optical modulator 1 is driven normally. Whether the positive voltage or the negative voltage is selected is uniquely determined by the internal structure of the semiconductor optical modulator 1. The modulator drive signals are each applied to two optical waveguides (also referred to as branches below) of the MZ interferometer 2 through a drive signal input electrode 6a and a drive signal input electrode 6b. As a result, the phases of the two lights propagating through the two branches become $\varphi(V_{data} + V_4)$ and $\varphi(-V_{data} + V_4)$. Here, $\varphi(v)$ is a function that takes the voltage of a modulator drive signal as an argument.

Next, a moment where both $V_{data}$ and $-V_{data}$ have become the GND level is considered. In order to generate a CS-RZ light, the output light of the MZ interferometer 2 must be quenched at this moment. In other words, the MZ interferometer 2 must be biased to a null point. In order to achieve this condition, two types of voltages, namely phase difference adjustment bias voltages $V_{70} \pm V_7$, are generated by a phase difference adjustment bias voltage generator 70, and the generated voltages thereof are each applied to the two branches of the MZ interferometer 2 via phase difference adjustment bias electrodes 7a and 7b. Here, $V_{70} \pm V_7$ are set to always be positive or negative. The phase changes of the two lights propagating through the two branches caused by the phase difference adjustment bias voltages $V_{70} \pm V_7$, when expressed by a function $\theta(v)$ representing a phase difference adjustment potential bias voltage, are $\theta(V_{70} + V_7)$ and $\theta(V_{70} - V_7)$. Since "$V_{data} = 0$" at the moment both $V_{data}$ and $-V_{data}$ have become the GND level, the phase difference between the two lights propagating through the two branches is expressed by equation (1) below.

$$\{\varphi(V_4) + \theta(V_{70} + V_7)\} - \{\varphi(V_4) + \theta(V_{70} - V_7)\} = \theta(V_{70} + V_7) - \theta(V_{70} - V_7) \quad (1)$$

In equation (1), nonessential terms have been omitted, and it is assumed that the characteristics of the drive signal input electrode 6a and the drive signal input electrode 6b are the same. With n as an integer, the voltage $V_7$ is fine-tuned to satisfy equation (2) below.

$$\theta(V_{70} + V_7) - \theta(V_{70} - V_7) = \pi \times (2n+1) \quad (2)$$

Consequently, it is possible to bias the MZ interferometer 2 to a null point, and a normal CS-RZ light can be generated. In the above description, a semiconductor-type optical modulator has been described. In optical modulators using $LiNbO_3$, either a positive or negative electric field can be applied. Further, since the drive signal bias voltage $V_4$ and the voltage $V_{70}$ in the phase difference adjustment bias voltages $V_{70} \pm V_7$ are not necessarily required, it is acceptable to set "$V_4 = V_{70} = 0$".

Proposed as a method of adjusting the phase difference adjustment bias voltages $V_{70}\pm V_7$ to optimal values is a method that includes monitoring an optical power of a modulated light that is output from the MZ interferometer 2, and detecting a deviation from an optimal value (for example, see Non-Patent Document 1). Generally, the optical power of the modulated light that is output from the MZ interferometer 2 depends on the phase difference adjustment bias voltages $V_{70}\pm V_7$. In CS-RZ modulation, when the phase difference adjustment bias voltages are optimal, the optical power takes an extreme value, i.e., a maximum value or a minimum value. The extreme value it becomes depends on the drive amplitude, the presence of a Nyquist filter, and the like.

FIG. 15 is a graph showing a relationship of the optical power of the modulated light when the phase difference adjustment bias voltages in a conventional optical transmitter are changed from the optimal values. More specifically, FIG. 15 is a graph showing a result of simulating the relationship between the deviation from the optimal value of the bias and the optical power of the modulated light in a conventional optical transmitter. The vertical axis shows the optical power in arbitrary units (arb). The horizontal axis $V_{drift}$ shows the deviation of the bias voltage in units of $V\pi@DC$, that is to say, as a value normalized to $V\pi@DC$. Here, $V\pi@DC$ corresponds to a half-wave voltage of the phase difference adjustment bias electrode 7a and the phase difference adjustment bias electrode 7b in FIG. 14. Circular symbols represent the case where the RMS (Root Mean Square) value of a differential voltage $2\times V_{data}$ of the drive signal is 0.8 times $V\pi@RF$. Square symbols represent the case where the RMS value of $2\times V_{data}$ is 0.45 times $V\pi@RF$. Here, $V\pi@RF$ corresponds to a half-wave voltage of the drive signal input electrode 6a and the drive signal input electrode 6b.

In FIG. 15, although there are some variations in the optical power among the same symbols, this is due to the calculation results obtained under different conditions being drawn superimposed. In each case, when the horizontal axis is zero, that is to say, when the phase difference adjustment bias is optimal, the optical power of the modulated light takes an extreme value i.e. a maximum value or a minimum value. This characteristic can be utilized to monitor the drift in the optimal value of the bias voltage, and it becomes possible to always maintain an optimal bias voltage.

PRIOR ART DOCUMENTS

Non-Patent Document

[Non-Patent Document 1] Hiroto Kawakami, Takayuki Kobayashi, Eiji Yoshida and Yutaka Miyamoto, "Auto bias control technique for optical 16-QAM transmitter with asymmetric bias dithering", Optics Express, 2011, Vol. 19, No. 26, p. B308-B312.

SUMMARY OF INVENTION

Problem to be Solved by the Invention

In an optical transmission system using adaptive modulation and demodulation, it is necessary for the optical transmitter to select an appropriate signal format depending on the condition of the transmission path. It means that when the signal format and the drive amplitude are changed, it is necessary to switch between controlling the optical power to become maximized (the state represented by circular symbols in FIG. 15) and controlling the optical power to become minimized (square symbols in FIG. 15).

However, when such switching is attempted, there is a problem that the control circuit that controls the bias voltage becomes complicated. Furthermore, as shown by the triangular symbols in FIG. 15, when the RMS value of the differential voltage $2\times V_{data}$ of the drive signal voltage is about 0.5 times $V\pi@RF$, the optical power is almost independent from a bias drift. Therefore, there is a problem that it is not possible to use the bias voltage control method described above, which decide the optimum bias voltage with a maximum optical power or minimum optical power.

In view of the above circumstances, an object of the present invention is to provide an optical transmitter and a bias voltage control method that are capable of promptly controlling a bias to its optimum value irrespective of the drive amplitude or the modulation format at the time of start-up or when a bias drift occurs.

Means for Solving the Problem

An optical transmitter according to an aspect of the present invention includes: an optical modulator including an MZ interferometer that includes two optical waveguides, a drive signal input electrode that applies a drive signal that changes an optical phase of two optical signals, the two optical signals respectively propagating through the two optical waveguides, and a phase difference adjustment bias electrode that applies a phase difference adjustment bias voltage, the phase difference adjustment bias voltage adjusting the optical phase difference of the two signals by changing the optical phase of the two optical signals; a drive amplifier that generates the drive signal and applies it to the drive signal input electrode; a phase difference adjustment bias voltage generator that generates the phase difference adjustment bias voltage and applies it to the phase difference adjustment bias electrode; a dithering unit that applies dithering of a predetermined frequency to an amplitude of the drive signal or to a half-wave voltage of the MZ interferometer; a controller unit that changes the phase difference adjustment bias voltage generated by the phase difference adjustment bias voltage generator based on a modulation component of the frequency that is superimposed onto modulated light that is output from the optical modulator, to thereby bias the MZ interferometer to a null point; and a synchronous detection circuit that synchronously detects the modulation component of the frequency that is superimposed onto the modulated light that is output from the optical modulator. The controller unit changes the phase difference adjustment bias voltage generated by the phase difference adjustment bias voltage generator such that a result of synchronous detection by the synchronous detection circuit becomes maximized or minimized, to thereby bias the MZ interferometer to the null point. Whether the controller unit maximizes or minimizes the result of synchronous detection is determined by a difference between a phase of a referenced clock signal and a phase of the dithering, and does not depend on the amplitude of the drive signal.

In the optical transmitter described above, the optical modulator may be an IQ modulator. The MZ interferometer may include an in-phase MZ interferometer and a quadrature-phase MZ interferometer. The drive signal input electrode may include a drive signal input electrode associated with the in-phase MZ interferometer, and a drive signal input electrode associated with the quadrature-phase MZ interferometer. The phase difference adjustment bias electrode may include a phase difference adjustment bias electrode associated with the in-phase MZ interferometer, and a phase difference adjustment bias electrode associated with the quadrature-phase MZ interferometer. The drive amplifier may include a drive amplifier provided for the in-phase MZ interferometer, and a drive amplifier provided for the quadrature-phase MZ interferometer. The phase difference adjustment bias voltage generator may include a phase difference adjustment bias voltage generator provided for the in-phase MZ interferometer, and a phase difference adjustment bias voltage generator provided for the quadrature-phase MZ interferometer. The controller unit, based on the modulation component of the frequency that is superimposed onto the modulated light that is output from the IQ modulator, may change a phase difference adjustment bias voltage applied by the phase difference adjustment bias voltage generator provided for the in-phase MZ interferometer, and a phase difference adjustment bias voltage applied by the phase difference adjustment bias voltage generator provided for the quadrature-phase MZ interferometer, to thereby bias each of the in-phase MZ interferometer and the quadrature-phase MZ interferometer to a null point.

In the optical transmitter described above, the dithering unit may apply the dithering by changing a gain of the drive amplifier at a time dithering of the frequency is applied to an amplitude of the drive signal.

The optical transmitter described above may further include: a drive signal bias voltage generator that generates and outputs a drive signal bias voltage that biases the drive signal. The dithering unit may apply the dithering by changing the drive signal bias voltage at a time dithering is applied to a half-wave voltage of the MZ interferometer.

In the optical transmitter described above, the controller unit, at a time of start-up, may set an amplitude of the drive signal to be smaller than an amplitude in a normal operation state.

In the optical transmitter described above, the controller unit, at a time of start-up, may set a half-wave voltage of the MZ interferometer to be larger than an amplitude in a normal operation state.

In the optical transmitter described above, the dithering unit may performs control such that, with respect to an amplitude of a drive signal or a half-wave voltage of the in-phase MZ interferometer and the quadrature-phase MZ interferometer included in the IQ modulator, at a time dithering is being applied to one of the in-phase MZ interferometer or the quadrature-phase MZ interferometer, dithering is not applied to the other of the in-phase MZ interferometer and the quadrature-phase MZ interferometer.

In the optical transmitter described above, the dithering unit may apply dithering of a different frequency or a different phase with respect to an amplitude of a drive signal or a half-wave voltage of the in-phase MZ interferometer and the quadrature-phase MZ interferometer included in the IQ modulator.

In the optical transmitter described above, the controller unit may have a function that changes, during a start-up sequence of the IQ modulator, a phase difference of two light signals being an output light of the in-phase MZ interferometer and an output light of the quadrature-phase MZ interferometer, n times (where n is a natural number). The controller unit may record as a candidate value the phase difference adjustment bias voltage at which a result of synchronous detection by the synchronous detection circuit becomes maximized or minimized, each of n times the change is performed, and employ an average value of the obtained n types of candidate values as the phase difference adjustment bias voltage.

In the optical transmitter described above, the controller unit may set the phase difference adjustment bias voltage so as to be a voltage Vpeak+Voffset, in which a predetermined fine-tuning offset value Voffset is added to a phase difference adjustment bias voltage Vpeak at which a synchronous detection result obtained by the synchronous detection circuit becomes an extreme value or zero.

A method for controlling a bias voltage according to an aspect of the present invention is a method for controlling a bias voltage in an optical transmitter, the optical transmitter including an optical modulator including an MZ interferometer including two optical waveguides, and includes the steps of: applying a drive signal that changes an optical phase of two optical signals, the two optical signals respectively propagating through the two optical waveguides; applying a phase difference adjustment bias voltage, the phase difference adjustment bias voltage adjusting the optical phase difference of the two signals by changing the optical phase of the two optical signals; applying dithering of a predetermined frequency to an amplitude of the drive signal or to a half-wave voltage of the MZ interferometer; changing the phase difference adjustment bias voltage based on a modulation component of the frequency that is superimposed onto modulated light that is output from the optical modulator, to thereby bias the MZ interferometer to a null point; and synchronously detecting the modulation component of the frequency that is superimposed onto the modulated light that is output from the optical modulator. The step of biasing includes the step of changing the phase difference adjustment bias voltage such that a result of synchronous detection becomes maximized or minimized, to thereby bias the MZ interferometer to the null point. Whether the result of synchronous detection is maximized or minimized is determined by a difference between a phase of a referenced clock signal and a phase of the dithering, and does not depend on the amplitude of the drive signal.

Effect of the Invention

According to an embodiment of the present invention, it is possible to promptly control a bias to a suitable value irrespective of the drive amplitude or the modulation format at the time of start-up or when a bias drift occurs.

EMBODIMENTS FOR CARRYING OUT THE INVENTION

First Embodiment

Figure 1:
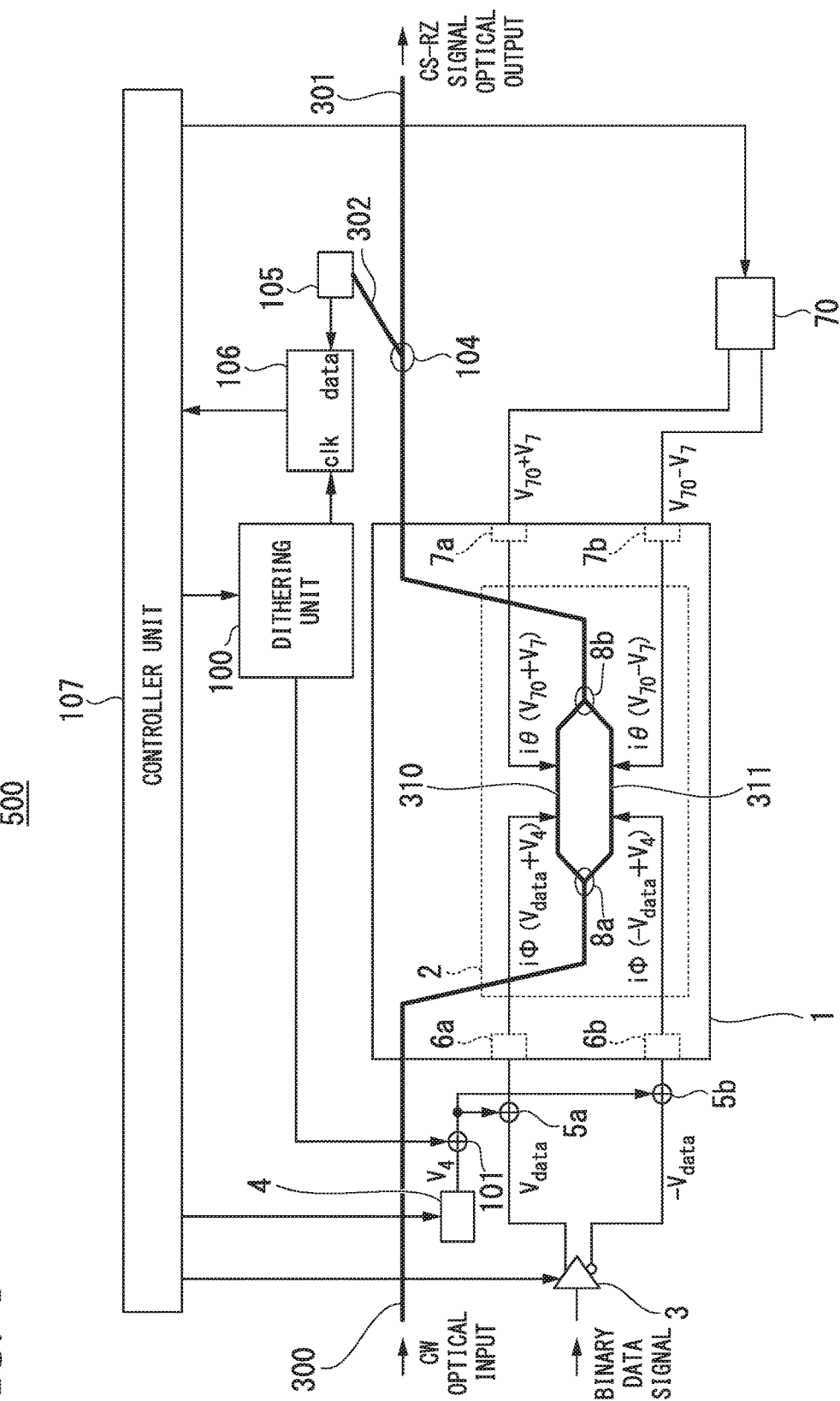
FIG. 1 is a block diagram showing an optical transmitter according to a first embodiment.

Hereunder, embodiments are described with reference to the drawings. FIG. 1 is a block diagram showing an optical transmitter 500 according to a first embodiment. The optical transmitter 500 includes a semiconductor optical modulator 1, a drive amplifier 3, bias adders 5a and 5b, a drive signal bias voltage generator 4, a phase difference adjustment bias voltage generator 70, optical waveguides 300, 301, and 302, a dithering unit 100, a dithering adder 101, a tap unit 104, a photodetector 105, a synchronous detection circuit 106, and a controller unit 107.

In the optical transmitter 500, the semiconductor optical modulator 1 includes an MZ interferometer 2, drive signal input electrodes 6a and 6b, and phase difference adjustment bias electrodes 7a and 7b. In the semiconductor optical modulator 1, the MZ interferometer 2 includes optical couplers 8a and 8b, and optical waveguides 310 and 311.

In the MZ interferometer 2, the optical coupler 8a branches a CW light propagating through the optical waveguide 300 to the optical waveguides 310 and 311. A phase difference is applied to the CW light propagating through the respective optical waveguides 310 and 311 as a result of a voltage being applied from the drive signal input electrodes 6a and 6b and the phase difference adjustment bias electrodes 7a and 7b. The optical coupler 8b multiplexes the CW light having the phase difference propagating through the optical waveguides 310 and 311, and generates a modulated light and outputs it to the optical waveguide 301.

The drive amplifier 3 is a differential output amplifier. The drive amplifier 3 receives a binary data signal to be transmitted, amplifies the binary data signal thereof, and generates and outputs the voltages $V_{data}$ and $-V_{data}$ that become drive signals. Furthermore, the drive amplifier 3 receives a control signal from the controller unit 107, and switches between on and off states. The drive signal bias voltage generator 4 receives an instruction signal from the controller unit 107, and generates and outputs a drive signal bias voltage $V_4$.

The dithering unit 100 receives an instruction signal from the controller unit 107 and outputs a signal that applies dithering of a predetermined frequency f. Furthermore, the dithering unit 100 outputs a clock signal of the frequency f to the synchronous detection circuit 106. The dithering adder 101 performs addition of the signal that applies dithering of the frequency f to the voltage $V_4$, and which is output from the drive signal bias voltage generator 4. The bias adders 5a and 5b add the drive signal bias voltage $V_4$ to which the dithering of the frequency f has been applied, to the voltages $V_{data}$ and $-V_{data}$ that have respectively been output from the drive amplifier 3, and output the results to the drive signal input electrodes 6a and 6b.

The tap unit 104 taps, that is to say, branches the modulated light output from the semiconductor optical modulator 1 and propagating through the optical waveguide 301, and outputs a portion of the light to the optical waveguide 302. The photodetector 105 receives the modulated light propagating through the optical waveguide 302, converts the light into an electric signal, and then outputs the signal. The synchronous detection circuit 106 receives the electric signal output from the photodetector 105, and the clock signal of the frequency f output from the dithering unit 100. Furthermore, the synchronous detection circuit 106 performs synchronous detection with respect to the electric signal based on the frequency of the clock signal thereof, and outputs information representing the result of synchronous detection to the controller unit 107.

The phase difference adjustment bias voltage generator 70 generates and outputs via the phase difference adjustment bias electrodes 7a and 7b, the phase difference adjustment bias voltages $V_{70}+V_7$ and $V_{70}-V_7$ which apply a phase difference to the CW light propagating through the optical waveguides 310 and 311. Furthermore, the phase difference adjustment bias voltage generator 70 receives an instruction signal from the controller unit 107 and sweeps the voltage of the voltage $V_7$. The controller unit 107 includes, for example, an automatic bias control circuit (ABC circuit), and performs adjustments by changing the phase difference adjustment bias voltage $V_{70}\pm V_7$ output from the phase difference adjustment bias voltage generator 70 upon receiving the result of synchronous detection output from the synchronous detection circuit 106. Moreover, the controller unit 107 outputs a control signal to the drive amplifier 3, and outputs an instruction signal to the drive signal bias voltage generator 4, the dithering unit 100, and the phase difference adjustment bias voltage generator 70.

Figure 15:
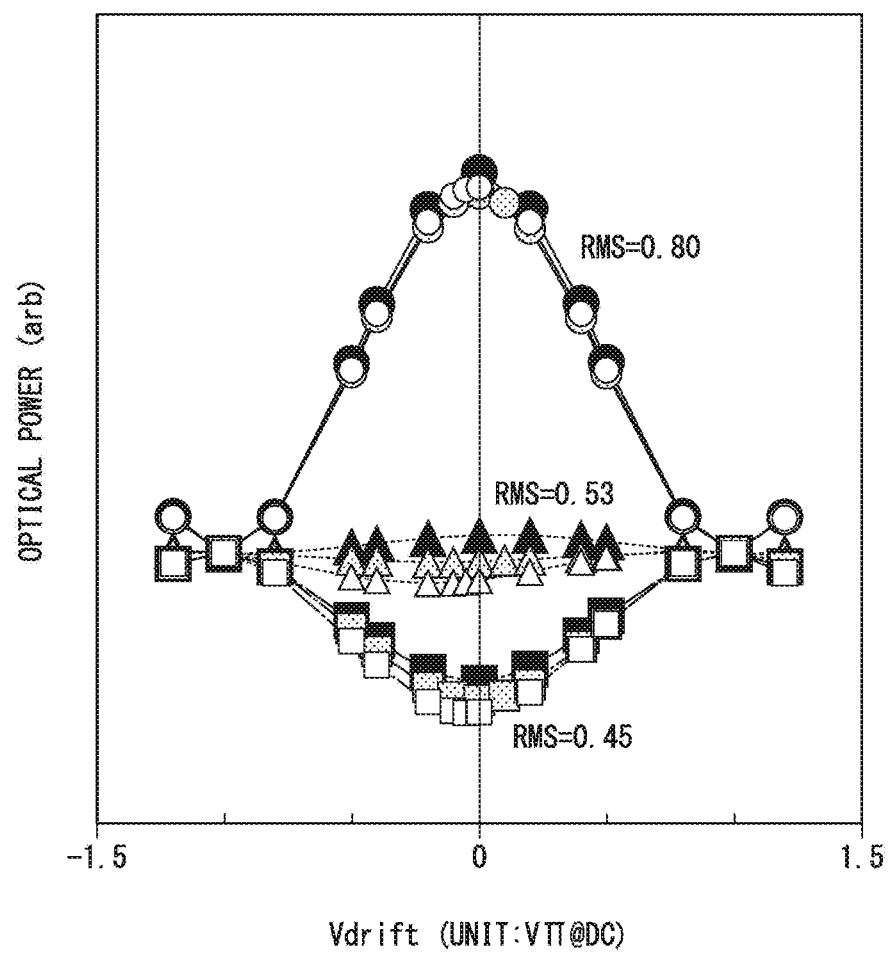
FIG. 15 is a graph showing a relationship of the optical power of a modulated light in a case where a phase difference adjustment bias voltage is changed from an optimal value in the conventional optical transmitter.

Next, a bias voltage control method in the controller unit 107 of the optical transmitter 500 described above will be described. In FIG. 15 mentioned above, it can be understood by looking at the sections at ±1 on the horizontal axis, that the optical power in those sections does not depend on the RMS value of $2\times V_{data}$, that is to say, it approximately coincides irrespective of the RMS value. Here, it can be understood by looking at the section at zero on the horizontal axis, that the dependence of the optical power on the RMS value of 2×Vdata is maximized in that section. That is to say, it can be understood that when the phase difference adjustment bias voltages $V_{70}\pm V_7$ are optimal, the change in the optical power with respect to tiny variation of the drive amplitude is maximized.

Therefore, when the dithering of the frequency f is applied to the amplitude of the drive signal, and the optical power of the modulated light is synchronously detected at the frequency f, it can be decided that the phase difference adjustment bias voltage is optimal if the absolute value of the synchronous detection result becomes a maximum value, and that the phase difference adjustment bias voltage has deviated from the optimal value if the result is any other value. It is possible to always optimize the phase difference adjustment bias voltages $V_{70}\pm V_7$ by performing feedback of the decision to the phase difference adjustment bias voltages $V_{70}\pm V_7$. The phase difference adjustment bias voltages $V_{70} \pm V_7$ can be similarly optimized if the dithering of the frequency f is applied to $V\pi@RF$ of the MZ interferometer 2 instead of the amplitude of the drive signal.

Bias Voltage Control Processing According to First Embodiment

Figure 2:
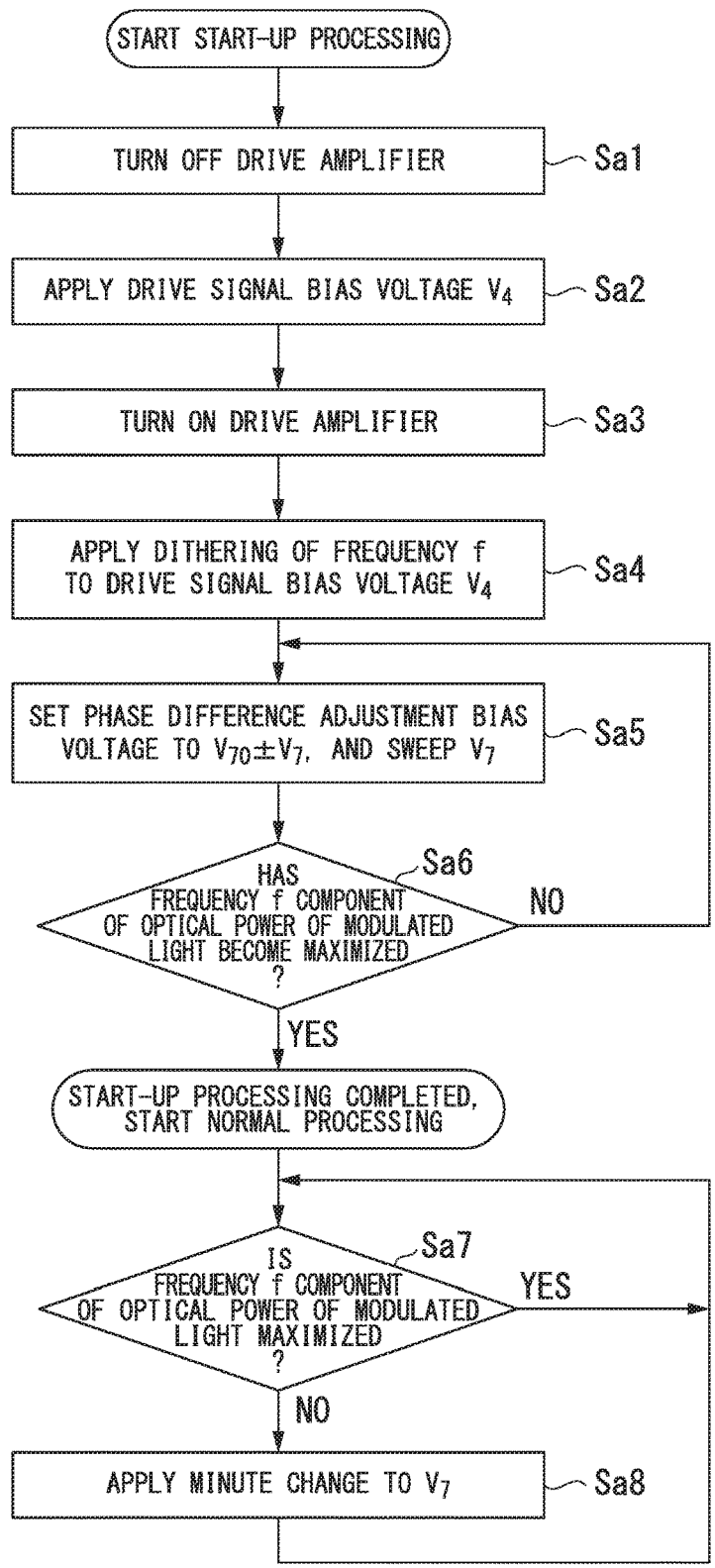
FIG. 2 is a flowchart showing processing that controls a bias voltage according to the first embodiment.

FIG. 2 is a flowchart showing processing that controls a bias voltage according to the first embodiment. The processing that controls the bias voltage for phase difference adjustment by the controller unit 107 at the time of start-up of the optical transmitter 500 will be described with reference to FIG. 2.

When start-up sequence is started, the controller unit 107 firstly outputs a control signal to turn off the drive amplifier 3. Upon receiving the control signal thereof, the drive amplifier 3 becomes an off state and the amplitude of $V_{data}$ and $-V_{data}$ of the drive signal becomes zero (step Sa1). This can be realized, for example, by applying a configuration in which the electric power supplied to the drive amplifier 3 is set to zero.

Next, the controller unit 107 outputs an instruction signal to the drive signal bias voltage generator 4. Upon receiving the instruction signal thereof, the drive signal bias voltage generator 4 generates and outputs the drive signal bias voltage $V_4$. The bias adders 5a and 5b add the drive signal bias voltage $V_4$ to the respective drive signals $V_{data}$ and $-V_{data}$, and apply the voltages $V_{data}+V_4$ and $-V_{data}+V_4$ to the drive signal input electrodes 6a and 6b (step Sa2). Here, the drive signal bias voltage $V_4$ is set such that the voltages $V_{data}+V_4$ and $-V_{data}+V_4$ that are respectively applied to the drive signal input electrodes 6a and 6b are always positive or always negative. Whether the positive voltage or the negative voltage is selected is uniquely determined by the internal structure of the semiconductor optical modulator 1. In the semiconductor optical modulator 1, $V\pi@RF$ changes according to the drive signal bias voltage $V_4$. Consequently, it is necessary to set the drive signals $\pm V_{data}$ of the drive amplifier and the drive signal bias voltage $V_4$ such that the desired change amount of the optical electric field can be obtained.

Next, the controller unit 107 outputs a control signal to turn on the drive amplifier 3. This can be achieved, for example, by resuming the electric power supply to the drive amplifier 3. Upon receiving the control signal thereof, the drive amplifier 3 generates and outputs the drive signals $\pm V_{data}$ (step Sa3). The controller unit 107 outputs an instruction signal to the dithering unit 100. Upon receiving the instruction signal thereof, the dithering unit 100 generates and outputs a signal that applies dithering of the frequency f. The dithering adder 101 performs addition of the output signal that is output from the dithering unit 100 and the drive signal bias voltage $V_4$, and outputs a drive signal bias voltage $V_4$ to which dithering of the frequency f has been applied (step Sa4). In the semiconductor optical modulator 1, $V\pi@RF$ changes according to the voltage value of the drive signal bias voltage $V_4$. Consequently, $V\pi@RF$ is dithered at the frequency f.

The CW light is modulated by the MZ interferometer 2 of the semiconductor optical modulator 1. The modulated light output from the semiconductor optical modulator 1 is tapped by the tap unit 104, and is received by the photodetector 105 through the optical waveguide 302. The photodetector 105 converts the received modulated light to an electric signal, and outputs the signal to the synchronous detection circuit 106. The synchronous detection circuit 106, based on the clock signal of the frequency f output from the dithering unit 100, performs synchronous detection of an intensity modulation component of the frequency f with respect to the electric signal output from the photodetector 105, and outputs the result of synchronous detection to the controller unit 107.

In order for the modulated light to be made a CS-RZ light, it is necessary to perform biasing to a null point by means of the phase difference adjustment bias voltage of the semiconductor optical modulator 1. Therefore, the controller unit 107 outputs to the phase difference adjustment bias voltage generator 70 an instruction signal that adjusts the output voltage, causing the phase difference adjustment bias voltage generator 70 to generate and output the phase difference adjustment bias voltages $V_{70} \pm V_7$, and further, sweep the voltage $V_7$ (step Sa5). The controller unit 107 determines, based on the change in output of the result of synchronous detection from the synchronous detection circuit 106 resulting from sweeping the voltage $V_7$, whether or not the frequency f component that is superimposed onto the optical power of the modulated light has become maximized (step Sa6). Here, it can be decided that the frequency f component has become maximized when the synchronous detection result becomes maximized or minimized. Whether the synchronous detection result becomes maximized or minimized is determined by the phase difference between the referenced clock signal and the dithering.

If it is decided that the frequency f component is not maximized, the controller unit 107 causes the processing of step Say, that is to say, sweeping of the voltage $V_7$ by the phase difference adjustment bias voltage generator 70, to be continued. On the other hand, if it is determined that the frequency component f is maximized, the controller unit 107 outputs an instruction signal to the phase difference adjustment bias voltage generator 70 that causes sweeping of the voltage $V_7$ to be stopped. Then, start-up sequence is completed and normal operation is started. After shifting to a normal operation state, there is a concern that the optimal value of the phase difference adjustment bias voltages $V_{70} \pm V_7$ may drift over time. Therefore, the controller unit 107 periodically monitors whether or not the frequency f component of the optical power of the modulated light is maximized (step Sa7), and in the case of a deviation from the maximum value, performs processing of applying feedback to the phase difference adjustment bias voltage generator 70 to modify and correct the voltage $V_7$ (step Sa8).

As a result of the configuration of the first embodiment described above, the drive signal bias voltage $V_4$ to which dithering of the frequency f has been applied by the dithering unit 100, is added to the drive signals $\pm V_{data}$ and then applied to the semiconductor optical modulator 1. The MZ interferometer 2 of the semiconductor optical modulator 1 performs modulation with respect to the CW light propagating through the optical waveguides 310 and 311 based on the drive signals $\pm V_{data}$ that have been biased by the drive signal bias voltage $V_4$ that include dithering of the frequency f. The synchronous detection circuit 106 synchronously detects the modulated light converted into an electric signal by the photodetector 105, based on the clock signal of the frequency f output from the dithering unit 100. The controller unit 107 causes the phase difference adjustment bias voltage generator 70 to start applying and sweeping the phase difference adjustment bias voltage, and decides whether or not the frequency f component of the optical power of the modulated light is maximized based on the result of synchronous detection, which is chancing during the sweeping, and stops sweeping when it has become maximized.

As a result, at the time of start-up, the MZ interferometer 2 can be biased to a null point, that is to say, the output light of the MZ interferometer 2 is quenched in the case where the drive signals ±$V_{data}$ have become the GND level. Further, the modulated light output from the semiconductor optical modulator 1 can be made a CS-RZ light. Moreover, also after shifting to a normal operation state, by periodically deciding whether or not the frequency f component of the optical power of the modulated light is maximized, the phase difference adjustment bias voltages $V_{70}$±$V_7$ can be returned to appropriate values (for example, optimal values) even at the time a bias drift has occurred. Therefore, at the time of start-up or at the time a bias drift has occurred, it becomes possible to promptly control the bias to an appropriate value by a convenient and stable method irrespective of the drive amplitude or the modulation format.

In the present embodiment, dithering was applied to Vπ@RF by changing the drive signal bias voltage $V_4$ giving consideration to the semiconductor optical modulator. In general, Vπ@RF of an optical modulator, whether a semiconductor optical modulator or another type of optical modulator, depends on the electric field distribution and temperature within the modulator housing. It is also possible to dither Vπ@RF at frequency f by applying modulation of a period f to the state within these modulators.

Second Embodiment

Figure 3:
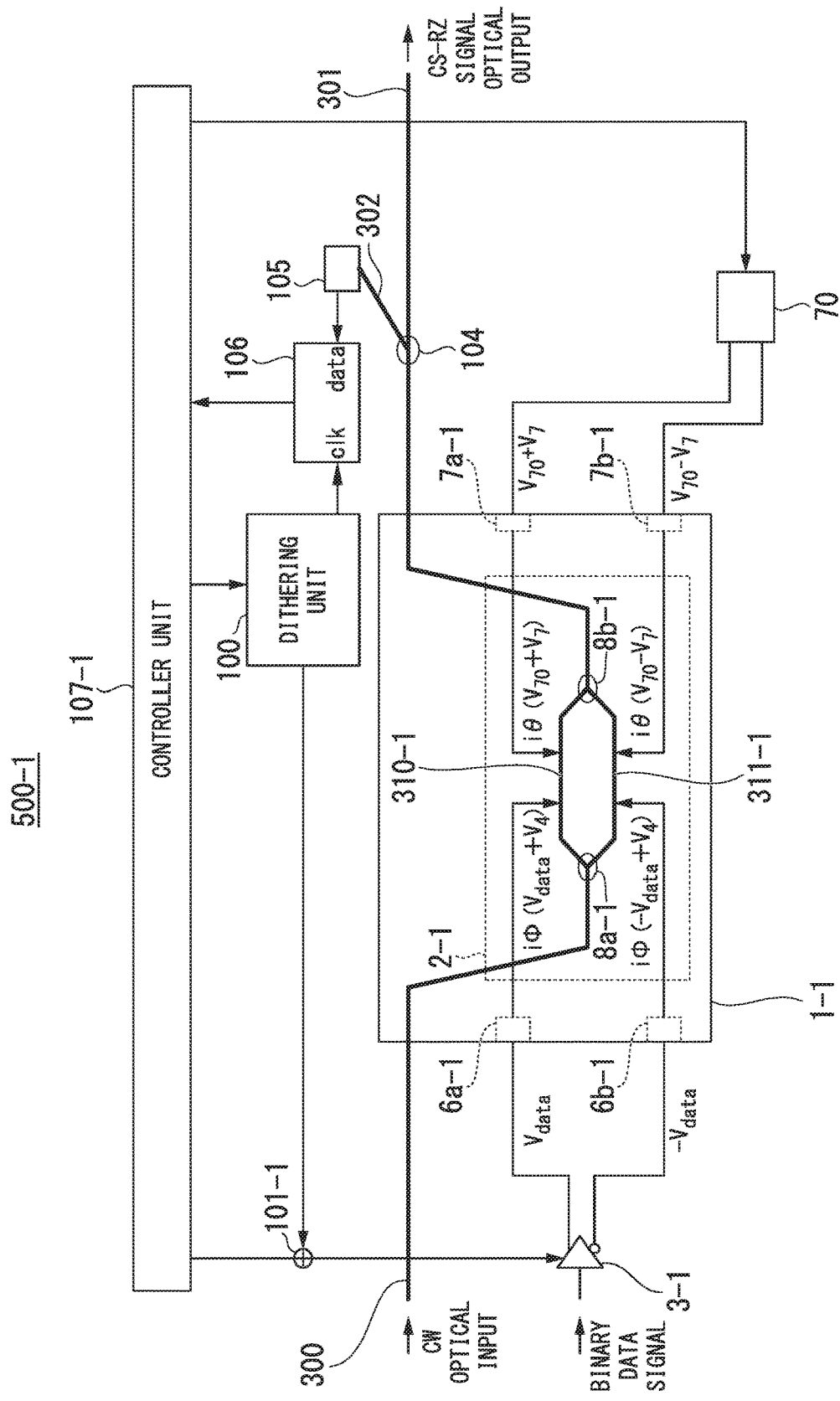
FIG. 3 is a block diagram showing a configuration of an optical transmitter according to a second embodiment.

FIG. 3 is a block diagram showing a configuration of an optical transmitter 500-1 according to a second embodiment. The same components as those of the first embodiment are denoted by the same reference symbols, and those components that differ will be described below. The optical transmitter 500-1 includes a $LiNbO_3$ optical modulator 1-1 in place of the semiconductor optical modulator 1 of the first embodiment. A drive amplifier 3-1, in addition to switching on and off, controls the gain according to a control signal from a controller unit 107-1. In the $LiNbO_3$ optical modulator 1-1, a drive signal bias voltage is normally not used. Consequently, the optical transmitter 500-1 does not include the drive signal bias voltage generator 4, the dithering adder 101, and the bias adders 5a and 5b of the first embodiment. Instead, the optical transmitter 500-1 includes a dithering adder 101-1 on a control line from the controller unit 107-1 to the drive amplifier 3-1. The dithering adder 101-1 is connected to the output of the dithering unit 100.

In addition to the function of the controller unit 107 of the first embodiment, the controller unit 107-1 outputs to the drive amplifier 3-1 a control signal that controls the gain of the drive amplifier 3-1. The dithering adder 101-1 performs addition of a signal output by the dithering unit 100 that applies dithering and the control signal output by the controller unit 107-1 that controls the gain, and outputs the result to the drive amplifier 3. As a result of this configuration, the gain of the drive amplifier 3 is dithered, and consequently the amplitude of the drive signals ±$V_{data}$ is dithered.

Here, if swing ratio is defined as the "amplitude of the drive signals/(2×Vπ@RF)" is defined as a swing ratio, Vπ@RF in the denominator is dithered in the first embodiment, whereas the amplitude of the drive signal in the numerator is dithered in the second embodiment. In both the first and second embodiments, there is no change to the fact that the swing ratio is dithered, and the effect obtained by the configuration of the first embodiment is also achieved in the second embodiment.

Third Embodiment

Next, a third embodiment according to the present invention will be described. In the first and second embodiments described above, a configuration that controls the phase difference adjustment bias voltages $V_{70}$±$V_7$ by means of the semiconductor optical modulator 1 including a single MZ interferometer 2 was described assuming an optical transmitter for generating a CS-RZ light. In contrast, in the third embodiment, control of multiple phase difference adjustment bias voltages is performed in an IQ (in-phase quadrature-phase) modulator for generating a QAM (quadrature amplitude modulation) signal light.

Figure 4:
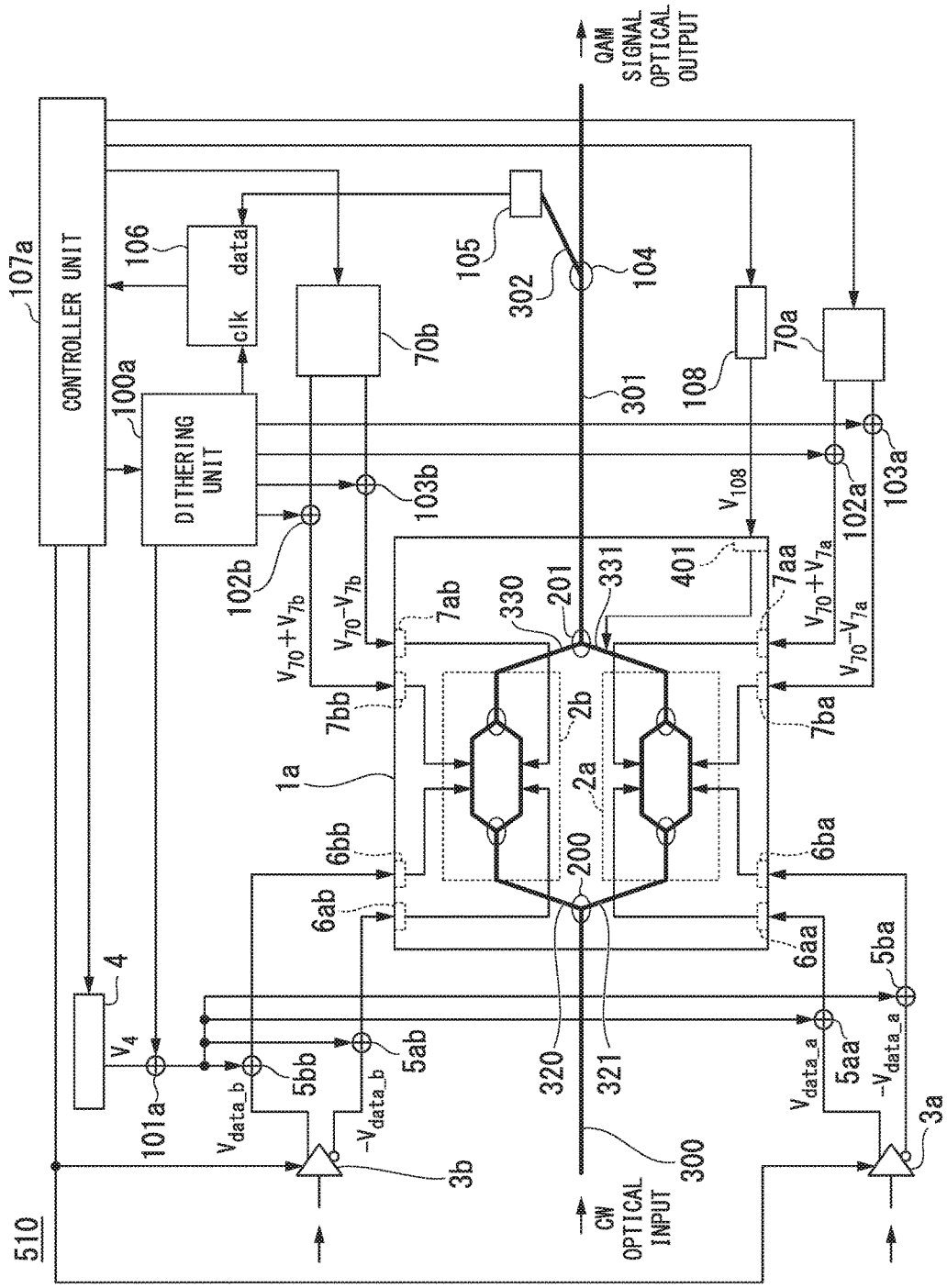
FIG. 4 is a block diagram showing a configuration of an optical transmitter according to a third embodiment.

FIG. 4 is a block diagram showing a configuration of an optical transmitter 510 according to the third embodiment. The same components as those of the first and second embodiments are denoted by the same reference symbols, and those components that differ will be described below. The optical transmitter 510 includes an IQ modulator 1a, optical waveguides 300 and 301, an in-phase drive amplifier 3a and phase difference adjustment bias voltage generator 70a, a quadrature-phase drive amplifier 3b and phase difference adjustment bias voltage generator 70b, a modulated light phase difference adjustment bias voltage generator 108, a tap unit 104, an optical waveguide 302, a photodetector 105, a synchronous detection circuit 106, a controller unit 107a, a dithering unit 100a, a drive signal bias voltage generator 4, dithering adders 101a, 102a, 102b, 103a, and 103b, and bias adders 5aa, 5ba, 5bb, and 5ab.

The IQ modulator 1a is a semiconductor optical modulator for example. The IQ modulator 1a includes an in-phase MZ interferometer 2a and a quadrature-phase MZ interferometer 2b (the MZ interferometers 2a and 2b are also respectively referred to as child MZIs below) in each of the two branches of a single MZ interferometer (also referred to as a parent MZI below). The internal configuration of the MZ interferometers 2a and 2b is the same as the internal configuration of the MZ interferometer 2 according to the first embodiment. Hereunder, when the internal configuration of the respective MZ interferometers 2a and 2b is described in detail, this is described with an additional suffix such as a or b appended to the reference symbol (for example, an optical coupler of the MZ interferometer 2a, which corresponds to the optical coupler 8a of the MZ interferometer 2, is represented by optical coupler 8a-a).

Furthermore, the IQ modulator 1a includes optical couplers 200 and 201, optical waveguides 320, 321, 330, and 331, four drive signal input electrodes 6aa, 6ba, 6bb and 6ab, and four phase difference adjustment bias electrodes 7aa, 7ba, 7bb, and 7ab. Moreover, the IQ modulator 1a includes a parent MZI modulated light phase difference adjustment bias electrode 401 that applies a phase difference to each of the modulated lights output from the respective MZ interferometers 2a and 2b. The optical coupler 200 branches the CW light propagating through the optical waveguide 300 and outputs the light to the optical waveguides 320 and 321. The optical waveguides 320 and 321 connect to the input side of the MZ interferometers 2a and 2b, which are respectively child MZIs. The optical waveguides 330 and 331 connect to the output side of the MZ interferometers 2a and 2b, which are respectively child MZIs. The optical coupler 201 multiplexes the modulated light propagating through the optical waveguide 330 and the modulated light propagating through the optical waveguide 331, to which an optical phase difference of ±π/2 is applied by means of a bias voltage applied to the modulated light phase difference adjustment bias electrode 401, and outputs the light to the optical waveguide 301.

The drive signal input electrodes 6aa and 6ba are respectively connected to the drive amplifier 3a via the bias adders 5aa and 5ba, and apply drive signals to the MZ interferometer 2a. The drive signal input electrodes 6bb and 6ab are respectively connected to the drive amplifier 3b via the bias adders 5bb and 5ab, and apply drive signals to the MZ interferometer 2b. The phase difference adjustment bias electrodes 7aa and 7ba are connected to the phase difference adjustment bias voltage generator 70a via the dithering adders 102a and 103a, and apply phase difference adjustment bias voltages to the MZ interferometer 2a. The phase difference adjustment bias electrodes 7bb and 7ab are connected to the phase difference adjustment bias voltage generator 70b via the dithering adders 102b and 103b, and apply phase difference adjustment bias voltages to the MZ interferometer 2b. The parent MZI modulated light phase difference adjustment bias electrode 401 is connected to the modulated light phase difference adjustment bias voltage generator 108, and applies a modulated light phase difference adjustment bias voltage to the optical waveguide 331.

The drive amplifiers 3a and 3b, for example, receive quaternary data, and respectively generate and output the drive signals $\pm V_{data\_a}$ and $\pm V_{data\_b}$. Furthermore, the drive amplifiers 3a and 3b receive a control signal from the controller unit 107a and switch on and off. The phase difference adjustment bias voltage generators 70a and 70b respectively generate and output the phase difference adjustment bias voltages $V_{70} \pm V_{7a}$ and $V_{70} \pm V_{7b}$, which bias each of the in-phase MZ interferometer 2a and the quadrature-phase MZ interferometer 2b to a null point. Moreover, the phase difference adjustment bias voltage generators 70a and 70b receive an instruction signal from the controller unit 107a and change the respective phase difference adjustment bias voltages $V_{70} \pm V_{7a}$ and $V_{70} \pm V_{7b}$ that are generated. The modulated light phase difference adjustment bias voltage generator 108 receives an instruction signal from the controller unit 107a, and generates and outputs the modulated light phase difference adjustment bias voltage $V_{108}$ that sets the phase difference of the output light from the child MZIs, that is to say, the MZ interferometer 2a and the MZ interferometer 2b in the parent MZI, to $\pm \pi/2$. Furthermore, the modulated light phase difference adjustment bias voltage generator 108 receives an instruction signal from the controller unit 107a, and changes the modulated light phase difference adjustment bias voltage $V_{108}$ that is generated.

The dithering unit 100a receives an instruction signal from the controller unit 107a and generates a signal that applies dithering of the predetermined frequency f, and outputs the signal to the dithering adders 101a, 102a, 102b, 103a, and 103b. Furthermore, the dithering unit 100a outputs a clock signal of the frequency f to the synchronous detection circuit 106. The dithering adders 102a and 103a add dithering to the phase difference adjustment bias voltage $V_{70} \pm V_{7a}$, and output the result to the phase difference adjustment bias electrodes 7aa and 7ba. The dithering adders 102b and 103b add dithering to the phase difference adjustment bias voltage $V_{70} \pm V_{7b}$, and output the result to the phase difference adjustment bias electrodes 7bb and 7ab.

The dithering adder 101a adds dithering to the drive signal bias voltage $V_4$ output from the drive signal bias voltage generator 4, and outputs the result to the bias adders 5aa, 5ba, 5bb, and 5ab. The bias adders 5aa and 5ba respectively add the drive signal bias voltage $V_4$ to which dithering has been applied, to the drive signals $\pm V_{data\_a}$ output from the drive amplifier 3a, and output the result to the drive signal input electrodes 6aa and 6ba. The bias adders 5bb and 5ab respectively add the drive signal bias voltage $V_4$ to which dithering has been applied, to the drive signals $\pm V_{data\_b}$ output from the drive amplifier 3b, and output the result to the drive signal input electrodes 6bb and 6ab.

The controller unit 107a, based on the result of synchronous detection from the synchronous detection circuit 106, changes the phase difference adjustment bias voltages $V_{70} \pm V_{7a}$ and $V_{70} \pm V_{7b}$ of the phase difference adjustment bias voltage generators 70a and 70b, and the modulated light phase difference adjustment bias voltage $V_{108}$ of the modulated light phase difference adjustment bias voltage generator 108. As a result, while biasing the two MZ interferometers 2a and 2b to a null point, the phase difference of the respective output modulated lights is made $\pm \pi/2$. Furthermore, the controller unit 107a outputs a control signal to the drive amplifiers 3a and 3b. Moreover, the controller unit 107a outputs an instruction signal to the drive signal bias voltage generator 4, the dithering unit 100a, the phase difference adjustment bias voltage generators 70a and 70b, and the modulated light phase difference adjustment bias voltage generator 108.

Bias Voltage Control Processing According to Third Embodiment

Figure 5:
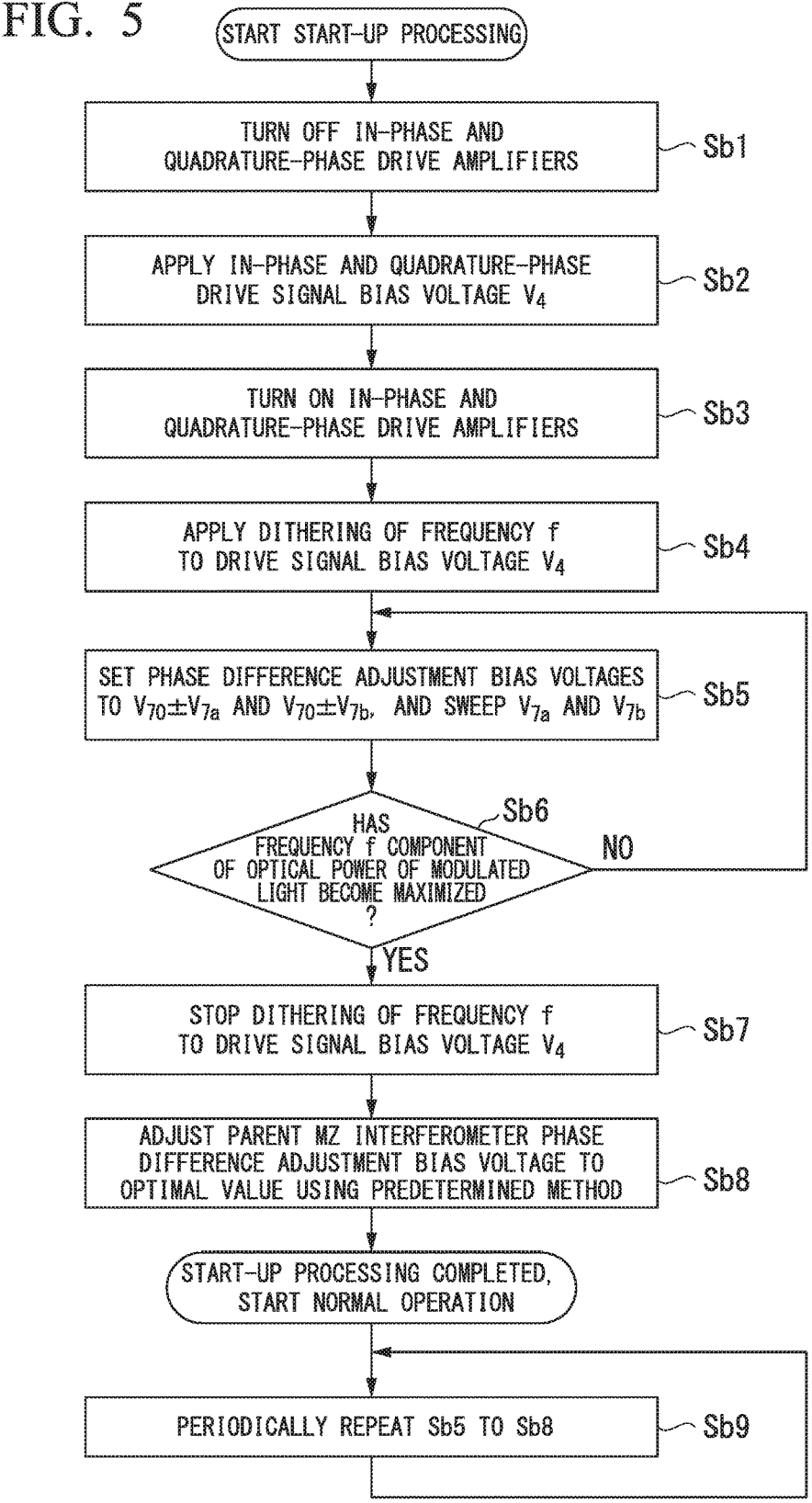
FIG. 5 is a flowchart showing processing that controls a bias voltage according to the third embodiment.

FIG. 5 is a flowchart showing processing that controls a bias voltage according to the third embodiment. Next, processing that controls the bias voltage for phase difference adjustment by the controller unit 107a at the time of start-up of the optical transmitter 510 in the third embodiment will be described with reference to FIG. 5.

When start-up sequence is started, the controller unit 107a firstly outputs a control signal to turn off the in-phase drive amplifier 3a and the quadrature-phase drive amplifier 3b. Upon receiving the control signal thereof, the drive amplifiers 3a and 3b become an off state and the amplitude of $V_{data}$ and $-V_{data}$ of the drive signal becomes zero (step Sb1). This can be realized, for example, by applying a configuration in which the electric power supplied to the drive amplifiers 3a and 3b is set to zero.

Next, the controller unit 107a outputs an instruction signal to the drive signal bias voltage generator 4. Upon receiving the instruction signal thereof, the drive signal bias voltage generator 4 generates and outputs a drive signal bias voltage $V_4$. The bias adders 5aa and 5ba add the drive signal bias voltage $V_4$ to the respective drive signals $V_{data\_a}$ and $-V_{data\_a}$, and apply the result to the drive signal input electrodes 6aa and 6ba. Furthermore, the bias adders 5bb and 5ab add the drive signal bias voltage $V_4$ to the respective drive signals $V_{data\_b}$ and $-V_{data\_b}$, and apply the result to the drive signal input electrodes 6bb and 6ab (step Sb2). Here, the drive signal bias voltage $V_4$ is set such that the voltages $\pm V_{data\_a} + V_4$ and $\pm V_{data\_b} + V_4$ that are respectively applied to the drive signal input electrodes 6aa, 6ba, 6bb, and 6ab are always positive or always negative. Whether the positive voltage or the negative voltage is selected is uniquely determined by the internal structure of the IQ modulator 1a. In the IQ modulator 1a, V$\pi$@RF changes according to the drive signal bias voltage $V_4$. Therefore, it is necessary to set the drive signals $\pm V_{data\_a}$ and $\pm V_{data\_b}$ of the drive amplifiers 3a and 3b and the drive signal bias voltage $V_4$ such that the desired change amount of the optical electric field can be obtained.

Next, the controller unit 107a outputs a control signal to turn on the drive amplifiers 3a and 3b. This can be achieved, for example, by resuming the electric power supply to the drive amplifiers 3a and 3b. Upon receiving the control signal thereof, the drive amplifier 3a generates and outputs the drive signals ±$V_{data\_a}$, and the drive amplifier 3b generates and outputs the drive signals ±$V_{data\_b}$ (step Sb3). The controller unit 107a outputs an instruction signal to the dithering unit 100a. Upon receiving the instruction signal thereof, the dithering unit 100a generates and outputs a signal that applies dithering of the frequency f. The dithering adder 101a performs addition of the signal that is output from the dithering unit 100a and the drive signal bias voltage $V_4$, and outputs a drive signal bias voltage $V_4$ to which dithering of the frequency f has been applied (step Sb4).

The modulated light output from the IQ modulator 1a is tapped by the tap unit 104, and is received by the photodetector 105 through the optical waveguide 302. The photodetector 105 converts the received modulated light to an electric signal, and outputs the result to the synchronous detection circuit 106. The synchronous detection circuit 106, based on the clock signal of the frequency f output from the dithering unit 100, performs synchronous detection of an intensity modulation component of the frequency f with respect to the electric signal output from the photodetector 105, and outputs the result of synchronous detection to the controller unit 107a.

The controller unit 107a outputs to the in-phase phase difference adjustment bias voltage generator 70a and the quadrature-phase phase difference adjustment bias voltage generator 70b an instruction signal that adjusts the output voltage. Upon receiving the instruction signal thereof, the phase difference adjustment bias voltage generator 70a generates the in-phase phase difference adjustment bias voltages $V_{70}+V_{7a}$ and $V_{70}-V_{7a}$, applies the respective voltages to the in-phase MZ interferometer 2a via the in-phase phase difference adjustment bias electrodes 7aa and 7ba, and sweeps the voltage $V_{7a}$. Furthermore, upon receiving the instruction signal thereof, the phase difference adjustment bias voltage generator 70b generates the quadrature-phase phase difference adjustment bias voltages $V_{70}+V_{7b}$ and $V_{70}-V_{7b}$, applies the respective voltages to the quadrature-phase MZ interferometer 2b via the quadrature-phase phase difference adjustment bias electrodes 7bb and 7ab, and sweeps the voltage $V_{7b}$ (step Sb5).

The controller unit 107a determines, based on the change in output of the result of synchronous detection from the synchronous detection circuit 106 resulting from sweeping the voltage $V_{7a}$ and the voltage $V_{7b}$, whether or not the frequency f component that is superimposed onto the optical power of the modulated light has become maximized (step Sb6). Here, it can be decided that the frequency f component has become maximized by the synchronous detection result becoming maximized or minimized. Whether it becomes maximized or minimized is determined by the difference between the phase of the referenced clock signal and the phase of the dithering.

If it is decided that the frequency f component is not maximized, the controller unit 107a causes the processing of step Sb5, that is to say, sweeping of the voltage $V_{7a}$ by the phase difference adjustment bias voltage generator 70a to be continued, and sweeping of the voltage $V_{7b}$ by the phase difference adjustment bias voltage generator 70b to be continued. On the other hand, if it is decided that the frequency component f is maximized, the controller unit 107a causes the respective phase difference adjustment bias voltage generators 70a and 70b to stop sweeping of the voltages $V_{7a}$ and $V_{7b}$, and outputs an instruction signal to the dithering unit 100a. Upon receiving the instruction signal thereof, the dithering unit 100a stops the dithering being applied to the output $V_4$ of the drive signal bias voltage generator 4 via the dithering adder 101a (step Sb7).

Next, the controller unit 107a uses asymmetric bias dithering as disclosed in Non-Patent Document 1 to adjust the parent MZI phase difference adjustment bias voltage to an appropriate value (for example, the optimal value) (step Sb8). Specifically, the controller unit 107a firstly outputs an instruction signal to the dithering unit 100a in order to apply dithering of the frequency f with respect to a total of four types of phase difference adjustment bias voltages, namely the voltages $V_{70}±V_{7a}$ which are the output from the in-phase phase difference adjustment bias voltage generator 70a, and the voltages $V_{70}±V_{7b}$ which are the output from the quadrature-phase phase difference adjustment bias voltage generator 70b.

Upon receiving the instruction signal thereof, the dithering unit 100a generates a signal that applies the dithering, and applies the dithering to the phase difference adjustment bias voltages $V_{70}±V_{7a}$ via the dithering adders 102a and 103a, and applies the dithering of the frequency f to the phase difference adjustment bias voltages $V_{70}±V_{7b}$ via the dithering adders 102b and 103b. Here, the dithering applied by the in-phase dithering adder 102a, and the dithering applied by the in-phase dithering adder 103a are set to have the same frequency but opposite signs. Furthermore, in the same manner, the dithering applied by the quadrature-phase dithering adder 102b, and the dithering applied by the quadrature-phase dithering adder 103b are set to have the same frequency but opposite signs. Moreover, the in-phase side dithering and the quadrature-phase dithering are set to, for example, $\cos(2\pi fd×t)$ and $\sin(2\pi fd×t)$, such that the phases are orthogonal.

The synchronous detection circuit, based on the clock signal of the frequency f output from the dithering unit 100a, synchronously detects a component of an even multiple of the frequency f with respect to the electric signal output from the photodetector 105, and outputs the result of synchronous detection to the controller unit 107a. The controller unit 107a transmits an instruction signal to the parent MZI modulated light phase difference adjustment bias voltage generator 108 that causes it to change the modulated light phase difference adjustment bias voltage $V_{108}$ such that the synchronous detection result approaches zero. Upon receiving the instruction signal thereof, the modulated light phase difference adjustment bias voltage generator 108 changes the modulated light phase difference adjustment bias voltage $V_{108}$. The parent MZI modulated light phase difference adjustment bias voltage $V_{108}$ is applied via the parent MZI modulated light phase difference adjustment bias electrode 401 to the optical waveguide 331, which is the output of the in-phase side MZ interferometer 2a, and changes the optical phase difference between the in-phase MZ interferometer 2a and the quadrature-phase MZ interferometer 2b. In the case the result of synchronous detection by the synchronous detection circuit 106 becomes zero, the optical phase difference thereof becomes ±π/2 of the optimal value (see Non-Patent Document 1).

As a result, start-up sequence is completed and processing shifts to a normal operation state. In the normal operation state, the controller unit 107a periodically repeats steps Sb5 to Sb8 (step Sb9).

Figure 6:
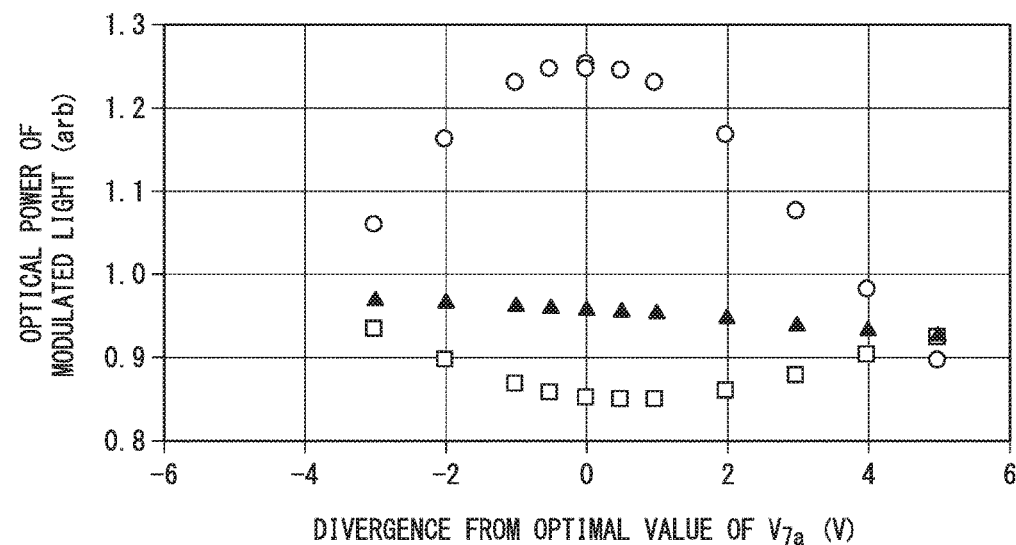
FIG. 6 is a graph showing a change in actual measured values of the optical power of a modulated light in a case where a phase difference adjustment bias voltage is changed from an optimal value in the third embodiment.

FIG. 6 assumes a signal format of QPSK (Quadrature Phase Shift Keying), and is a graph showing the change in actual measured values of the optical power of the modulated light in a case where the value of the voltage $V_{7a}$ included in the in-phase phase difference adjustment bias voltage is intentionally changed from the optimal value upon completion of start-up sequence. In FIG. 6, the horizontal axis represents the divergence of the voltage $V_{7a}$ from the optimal value. The point at which the horizontal axis is zero indicates that the voltage $V_{7a}$ is the optimal value. The vertical axis shows the optical power of the modulated light in arbitrary units (arb). At the time of the actual measurement shown in FIG. 6, the voltages $V_{7b}$ and $V_{108}$ are held at the optimal values. Here, the value obtained by dividing the differential amplitude ($2 \times V_{data\_a}$ or $2 \times V_{data\_b}$) of the drive signal by $2 \times V\pi@RF$ is defined as the swing ratio. The respective symbols in FIG. 6 represent a difference in the swing ratio. The circular symbols represent the case where the swing ratio is 100%. The triangular symbols represent the case where the swing ratio is about 50%. The square symbols represent the case where the swing ratio is about 40%. In QPSK, when the swing ratio is 50%, the RMS value of the drive voltage is approximately 0.5 times $V\pi$ (here, it is assumed that a Nyquist filter or other filtering is not used). The actual measured values shown in FIG. 6 approximately coincide with the simulation results shown in FIG. 15 mentioned above. However, the asymmetry with respect to the sign of the horizontal axis is noteworthy. This is a result of the nonlinearity of the optical electric field of the IQ modulator 1a output, with respect to the applied voltage.

Figure 7:
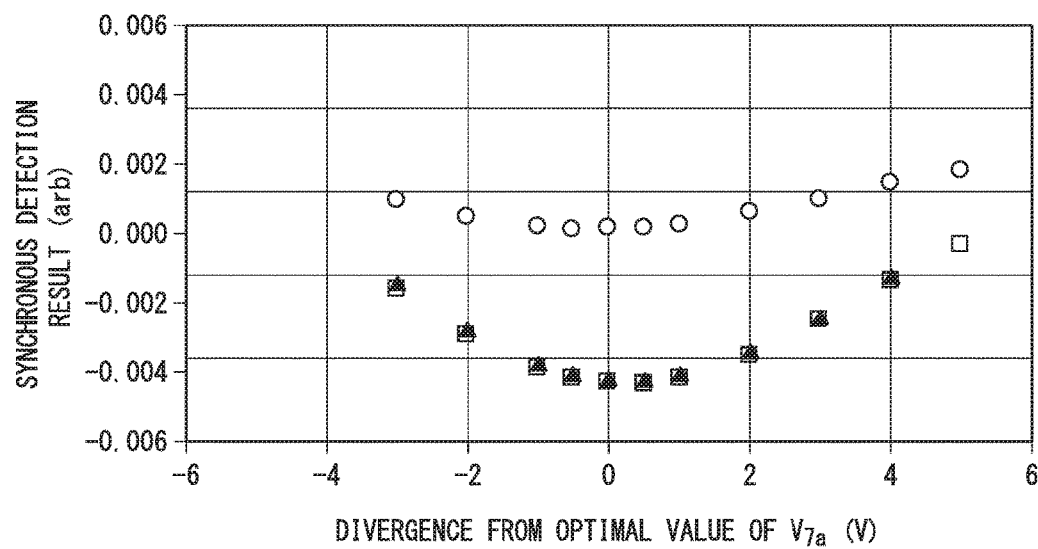
FIG. 7 is a graph showing measurement results when synchronous detection is performed while applying dithering to a drive signal bias voltage in the third embodiment.

FIG. 7 is a graph showing measurement results when synchronous detection is performed after applying dithering to the drive signal bias voltage $V_4$. The horizontal axis represents the divergence from the optimal value. The point at which the horizontal axis is zero indicates that all of the biases including the voltage $V_{7a}$ are at the optimal values. The vertical axis shows the synchronous detection result in arbitrary units (arb). In the same manner as FIG. 6, also in FIG. 7 the respective symbols represent a difference in the swing ratio. The circular symbols represent the case where the swing ratio is 100%. The triangular symbols represent the case where the swing ratio is about 50%. The square symbols represent the case where the swing ratio is about 40%. The synchronous detection result is approximately the minimum extreme value at the point where the horizontal axis is zero. A small deviation in the horizontal axis direction exists. This is derived from an error associated with a power detector that is built into the IQ modulator 1a. When the phase of the referenced clock signal is reversed, the synchronous detection result becomes approximately the maximum extreme value at the point where the horizontal axis is zero. Here, it should be noted that the absolute value of the synchronous detection result does not become maximized, but rather the synchronous detection result itself is a minimum (or maximum) extreme value when the bias becomes optimized. When the swing ratio is 100% (circular symbols), the synchronous detection result becomes zero when the bias is optimal. This is the minimum extreme value, but is not the maximum value as an absolute value.

As a result of the configuration of the third embodiment described above, the drive signal bias voltage $V_4$, to which dithering of the frequency f has been applied by the dithering unit 100a, is applied to the drive signals $\pm V_{data\_a}$ and the drive signals $\pm V_{data\_b}$ and then applied to the IQ modulator 1a. Consequently, the MZ interferometer 2a and the MZ interferometer 2b of the IQ modulator 1a perform modulation with respect to the CW light by means of the drive signals $\pm V_{data\_a}$ and the drive signals $\pm V_{data\_b}$ that have been biased by a bias voltage that includes dithering of the frequency f. The synchronous detection circuit 106 synchronously detects the modulated light converted to an electric signal by the photodetector 105, based on the clock signal of the frequency f output from the dithering unit 100a. The controller unit 107a causes the phase difference adjustment bias voltage generators 70a and 70b to start applying and sweeping the phase difference adjustment bias voltage, and decides whether or not the frequency f component of the optical power of the modulated light is maximized based on the result of synchronous detection, which is changing during the sweeping, and stops sweeping when it has become maximized.

Furthermore, the controller unit 107a adjusts the parent MZI modulated light phase difference adjustment bias voltage $V_{108}$ to the optimal value using asymmetric bias dithering.

As a result, the MZ interferometers 2a and 2b can be biased to a null point at the time of start-up. Moreover, even after shifting to a normal operation state, by periodically deciding whether or not the frequency f component of the optical power of the modulated light is maximized, the phase difference adjustment bias voltages $V_{70} \pm V_{7a}$ and the phase difference adjustment bias voltages $V_{70} \pm V_{7b}$ can be returned to the optimal value even at the time a bias drift has occurred. Therefore, at the time of start-up or at the time a bias drift has occurred, it becomes possible to promptly control the bias to an optimal value by a convenient and stable method irrespective of the drive amplitude or the modulation format.

In the third embodiment described above, the drive amplifiers 3a and 3b receive quaternary data and generate and output the drive signals $\pm V_{data\_a}$ and $\pm V_{data\_b}$ as an example. When the drive signals $\pm V_{data\_a}$ and $\pm V_{data\_b}$ are RF intensity modulation signals having n values, the modulated light output from the IQ modulator 1a becomes a QAM signal having order $n^2$.

Furthermore, in the third embodiment described above, in the same manner as the second embodiment, the case where a $LiNbO_3$ optical modulator is used as the IQ modulator 1a, rather than a semiconductor optical modulator, will be described. In this case, the drive signal bias voltage generator 4 becomes unnecessary. The controller unit 107a transmits a control signal that performs control of the gain of the drive amplifiers 3a and 3b, and the gain of the drive amplifiers 3a and 3b is dithered by means of the dithering unit 100a applying dithering to the control signal thereof. As a result, the amplitudes of the drive signals $\pm V_{data\_a}$ and $\pm V_{data\_b}$ become dithered.

Alternative Embodiment of Third Embodiment

In the optical transmitter 510 according to the third embodiment, as mentioned above, it is possible to find the phase difference adjustment bias voltages $V_{70} \pm V_{7a}$ and $V_{70} \pm V_{7b}$, and the modulated light phase difference adjustment bias voltage $V_{108}$ irrespective of the magnitude of the swing ratio. Incidentally, when the phase difference adjustment bias voltages $V_{70} \pm V_{7a}$ and $V_{70} \pm V_{7b}$, and the modulated light phase difference adjustment bias voltage $V_{108}$ have random initial values, such as at the time of start-up of the IQ modulator 1a, it is desirable to restrict the swing ratio only during the start-up sequence in order to perform start-up sequence rapidly and with certainty. For example, assume that, for any wavelength, the initial value $V_{40}$ of the drive signal bias voltage, and the gain of the in-phase drive amplifier 3a and the gain of quadrature-phase drive amplifier 3b are set such that the swing ratio becomes 50% or lower. As mentioned above, the swing ratio is expressed by the "differential amplitude of the drive signal ($2 \times V_{data\_a}$ or $2 \times V_{data\_b}$)/($2 \times V\pi@RF$)". Consequently, for example, the swing ratio is made 50% or lower as a result of the controller unit 107a making the value of the differential amplitude of the drive signal smaller than for the state of a normal operation, or making the half-wave voltage of Vπ@RF larger than for the state of a normal operation.

In this case, in almost all high order QAM signals, the optical power of the modulated light becomes minimized when the in-phase phase difference adjustment bias voltages $V_{70} \pm V_{7a}$ and the quadrature-phase phase difference adjustment bias voltages $V_{70} \pm V_{7b}$ are optimal (correspond to the square symbols in FIG. 15 mentioned above). Therefore, it becomes simple to rapidly find the optimal value of the phase difference adjustment bias voltage irrespective of the modulation format. At the time start-up sequence is completed, the controller unit 107a re-sets the drive signal bias voltage $V_4$ such that the swing ratio in a normal operation state can be achieved, and normal operation is performed in the same manner as for the third embodiment.

The method of restricting the swing ratio at the time of start-up can also be applied to the first and second embodiments.

In the first, second, and third embodiments described above, the phase difference adjustment bias voltages $V_7$, $V_{7a}$, and $V_{7b}$ at which fluctuations of the optical power of the modulated light becomes maximized is detected by means of synchronous detection by the synchronous detection circuit 106. However, the embodiment of the present invention is in no way limited to the embodiments described above. For example, if synchronous detection is difficult for any reason, a data recording device may be provided to enable a configuration in which both the optical power in the case the voltage $V_4$ output from the drive signal bias voltage generator 4 is slightly increased, and the optical power in the case the voltage $V_4$ is slightly decreased, are recorded in the recording device, and the voltages $V_7$, $V_{7a}$, and $V_{7b}$ are detected such that the difference between both recorded values becomes maximized.

Fourth Embodiment

Next, a fourth embodiment of the present invention will be described. In the optical transmitter 510 according to the third embodiment described above, the drive signal bias voltage $V_4$ to which dithering of the frequency f was applied by the dithering unit 100a, was added to both the drive signals $\pm V_{data\_a}$ and the drive signals $\pm V_{data\_b}$ in the same manner. In this configuration, the frequency f component superimposed onto the output from the photodetector 105 becomes a value reflecting both the in-phase phase difference adjustment bias voltage and the quadrature-phase phase difference adjustment bias voltage. Consequently, it becomes difficult to isolate the influence of both voltages. As a result, it becomes difficult to rapidly obtain the optimal voltages $V_{7a}$ and $V_{7b}$ to be added to the biases. In order to avoid this problem, dithering may be applied by time-sharing, to an in-phase side drive signal bias voltage $V_4$ and a quadrature-phase side drive signal bias voltage $V_4$. In other words, at the time dithering is applied to either the in-phase side drive signal bias voltage $V_4$ or the quadrature-phase side drive signal bias voltage $V_4$, it is sufficient to perform control such that dithering is not applied to the other voltage.

Figure 8:
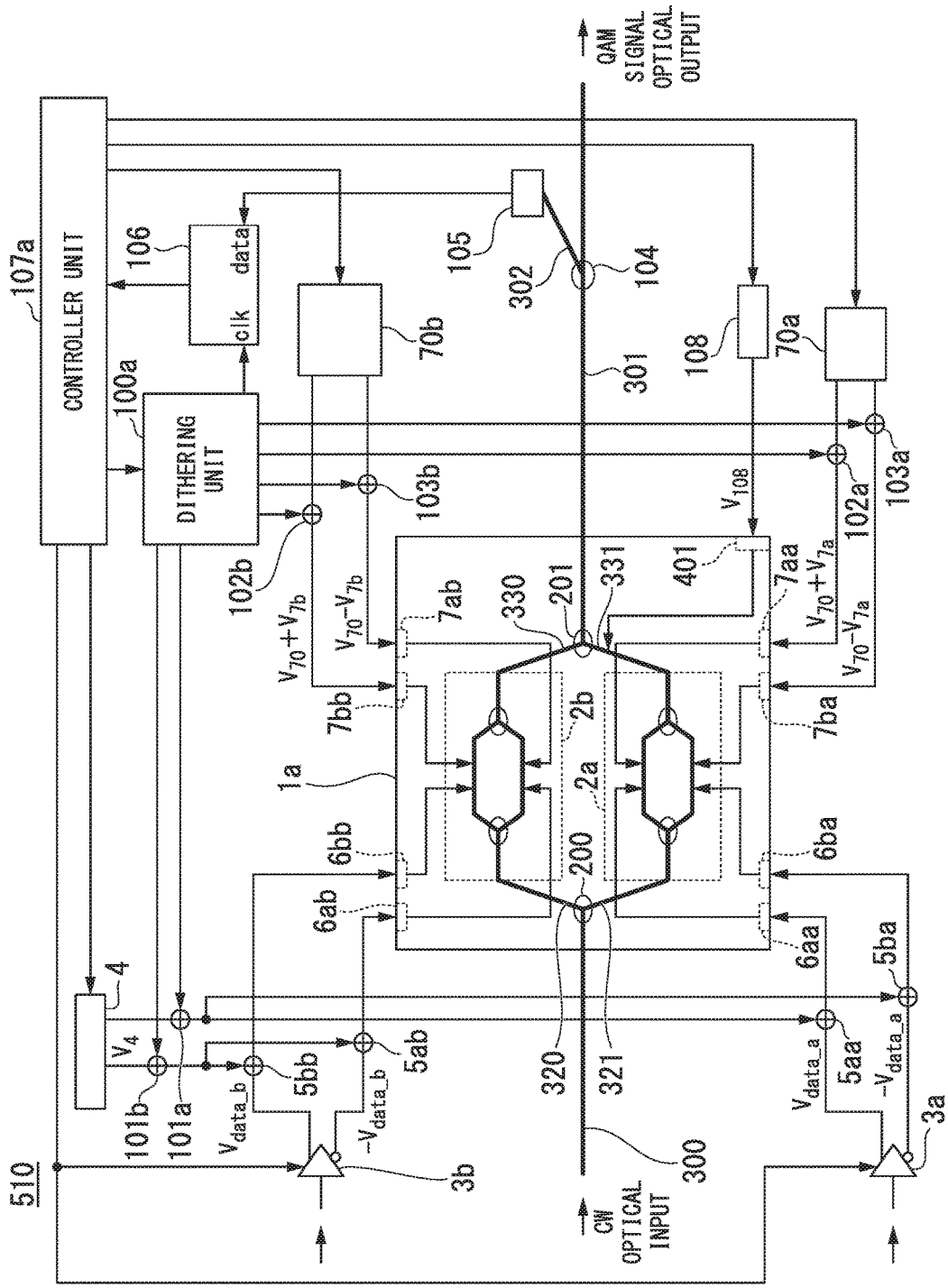
FIG. 8 is a block diagram showing a configuration of an optical transmitter according to a fourth embodiment.

FIG. 8 is a block diagram showing a configuration of an optical transmitter 510 according to the fourth embodiment. In FIG. 8, the same reference symbols are given to the same components as those of the first embodiment or the second embodiment, and the description is omitted. Hereunder, components that differ from the first embodiment or the second embodiment will be described.

The dithering unit 100a receives an instruction signal from the controller unit 107a, and generates a signal that applies dithering of a predetermined frequency f. The dithering unit 100a outputs the generated signal to the dithering adders 101a, 101b, 102a, 102b, 103a, and 103b. Here, the dithering unit 100a applies dithering to the dithering adders 101a and 101b and the other dithering adders by time-sharing. For example, during a period in which dithering is applied to the dithering adder 101a, dithering is not applied to the other dithering adders. For example, during a period in which dithering is applied to the dithering adder 101b, dithering is not applied to the other dithering adders.

The dithering adder 101a dithers the voltages $\pm V_{data\_a}$ by applying dithering to the drive signal bias voltage $V_4$ output from the drive signal bias voltage generator 4 and outputting the result to the bias adders 5aa and 5ba. The dithering adder 101b dithers the voltages $\pm V_{data\_b}$ by applying dithering to the drive signal bias voltage $V_4$ output from the drive signal bias voltage generator 4 and outputting the result to the bias adders 5ab and 5bb.

The controller unit 107a, based on the result of synchronous detection from the synchronous detection circuit 106, changes the phase difference adjustment bias voltages $V_{70} \pm V_{7a}$ and $V_{70} \pm V_{7b}$ output from the phase difference adjustment bias voltage generators 70a and 70b, and the modulated light phase difference adjustment bias voltage $V_{108}$ output from the modulated light phase difference adjustment bias voltage generator 108. During the period in which the dithering unit 100a performs dithering via the dithering adder 101a, the controller unit 107a controls only the phase difference adjustment bias voltage generator 70a. During the period in which the dithering unit 100a performs dithering via the dithering adder 101b, the controller unit 107a controls only the phase difference adjustment bias voltage generator 70b.

Bias Voltage Control Processing According to Fourth Embodiment

Figure 9:
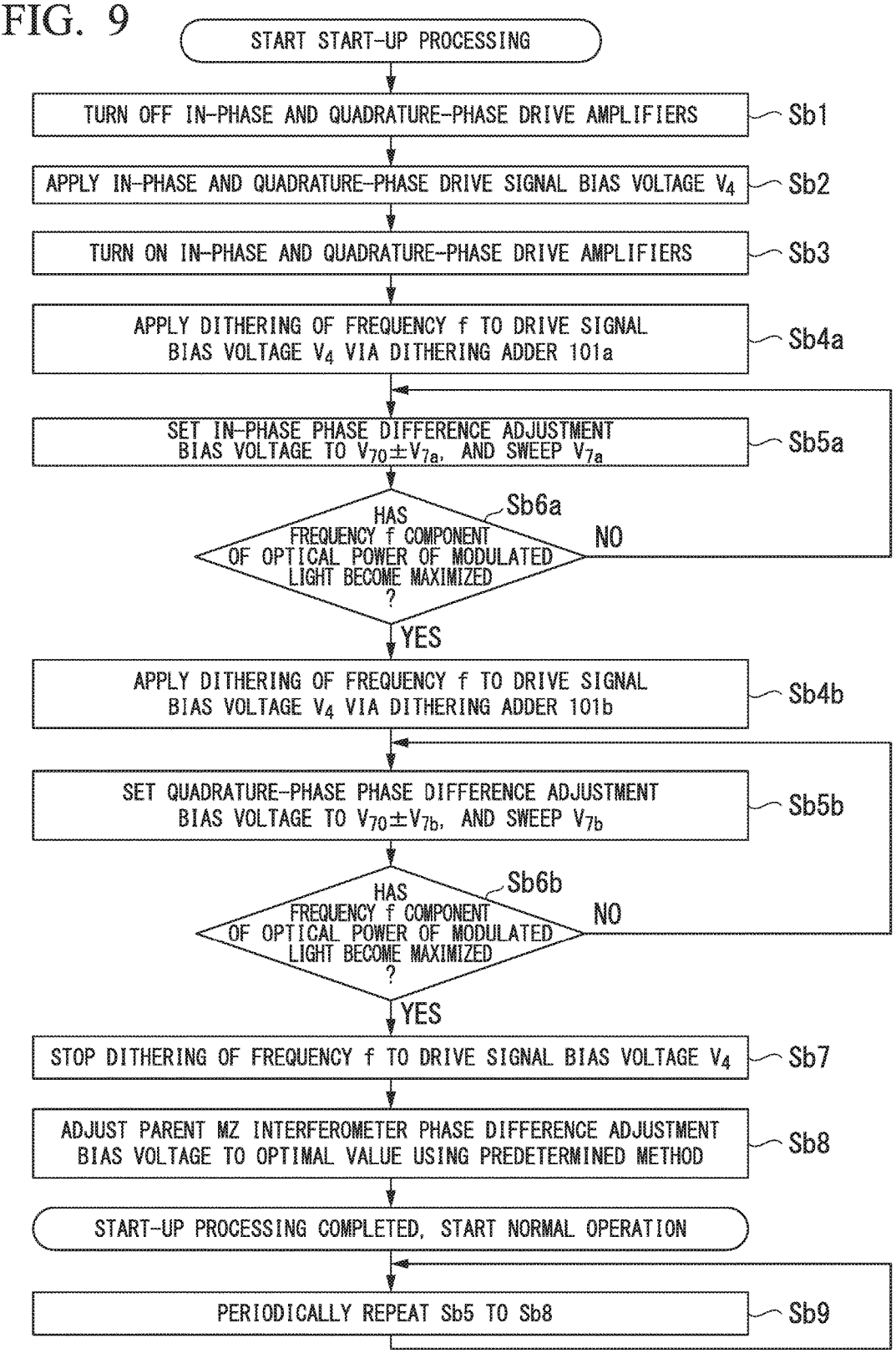
FIG. 9 is a flowchart showing processing that controls a bias voltage according to the fourth embodiment.

FIG. 9 is a flowchart showing processing that controls the bias voltage according to the fourth embodiment. Next, with reference to FIG. 9, the processing that controls the phase difference adjustment bias voltage by means of the controller unit 107a at the time of start-up of the optical transmitter 510 in the fourth embodiment will be described. The description of steps Sb1 to Sb3 and Sb7 to Sb9 are omitted since the processing is the same as that shown in FIG. 5. The steps Sb4 to Sb6 in FIG. 5 are replaced by steps Sb4a to Sb6a and Sb4b to Sb6b in the present control processing. Although the executed processing is similar to that of FIG. 5, in steps Sb4a to Sb6a, the dithering of the frequency f is performed via the dithering adder 101a. Furthermore, the phase difference adjustment bias voltage generator 70a only controls the voltage $V_{7a}$. In steps Sb4b to Sb6b, the dithering of the frequency f is performed via the dithering adder 101b. Moreover the phase difference adjustment bias voltage generator 70b only controls the voltage $V_{7b}$.

Alternative Embodiment of Fourth Embodiment

In the fourth embodiment, the voltages $\pm V_{data\_a}$ and $\pm V_{data\_b}$ were dithered by time-sharing as described above. Alternatively, it is possible to adopt a configuration in which the gains of the drive amplifier 3a and the drive amplifier 3b are dithered by time-sharing. Unlike a semiconductor optical modulator, an optical modulator using LiNbO$_3$ generally does not use a drive signal bias voltage V$_4$. Furthermore, it is difficult to change Vπ@RF. Therefore, in a similar manner to the second embodiment, it is possible to obtain the same effects as the effects mentioned above by dithering the gain of the drive amplifier by time-sharing.

Alternatively, instead of dithering by time-sharing, it is possible to adopt a configuration in which the voltages ±V$_{data\_a}$ and ±V$_{data\_b}$ are simultaneously dithered at different frequencies, or a configuration in which the gain of the drive amplifier 3a and the drive amplifier 3b are simultaneously dithered at different frequencies f1 and f2. In this case, the dithering unit 100a outputs two types of clock signals of frequencies f1 and f2 to the synchronous detection circuit 106, the synchronous detection circuit 106 performs two types of synchronous detection based on the clock signals, and control of the in-phase phase difference adjustment bias voltage and the quadrature-phase phase difference adjustment bias voltage is performed using these the two types of synchronous detection results. This configuration has the effect of being able to simultaneously control the in-phase phase difference adjustment bias voltage and the quadrature-phase phase difference adjustment bias voltage.

Alternatively, it is possible to adopt a configuration in which dithering is applied to the voltages ±V$_{data\_a}$ and ±V$_{data\_b}$ with the same frequency but with a phase that differs by 90 degrees, and a configuration in which the dithering is applied to the gain of the drive amplifier 3a and the drive amplifier 3b with the same frequency but with a phase that differs by 90 degrees. In this case, the dithering unit 100a outputs to the synchronous detection circuit 106 two clock signals of the frequency f but with phases that differ by 90 degrees, the synchronous detection circuit 106 performs two types of synchronous detection based on the clock signals, and control of the in-phase phase difference adjustment bias voltage and the quadrature-phase phase difference adjustment bias voltage is performed using the results of the two types of synchronous detection. This configuration has the effect of not only being able to simultaneously perform control of the in-phase phase difference adjustment bias voltage and the quadrature-phase phase difference adjustment bias voltage, but of also being able to unify the oscillation frequency of an oscillator or the center frequency of a bandpass filter within a synchronous detection circuit to a single type.

Fifth Embodiment

In the flowchart shown in FIG. 9, at first the in-phase MZ interferometer phase difference adjustment bias voltage is adjusted (step Sb4a to Sb6a). Then, the quadrature-phase MZ interferometer phase difference adjustment bias voltage is adjusted (step Sb4b to Sb6a). Finally, the parent MZ interferometer phase difference adjustment bias voltage is controlled (step Sb7 to Sb8). However, depending on the configuration of the IQ modulator, if the control of steps Sb4a to Sb6a or steps Sb4b to Sb6a is performed in a state where the parent MZ interferometer phase difference adjustment bias voltage is not optimal, the in-phase or quadrature-phase bias voltage may become locked to a value that is not optimal.

Figure 10:
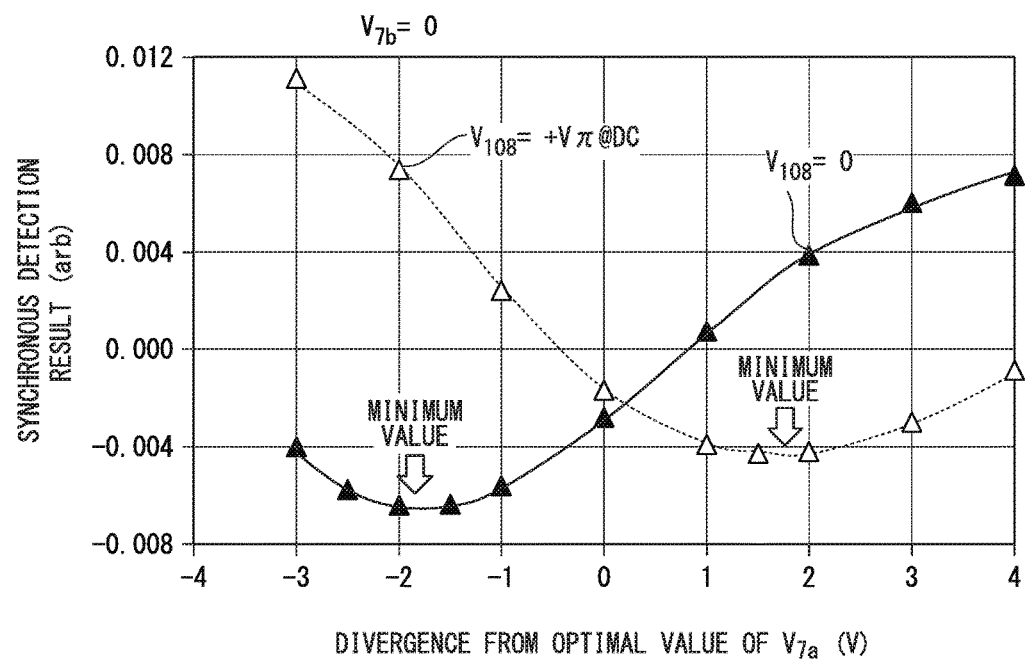
FIG. 10 is a drawing showing an example of actual measured values in a fifth embodiment.

FIG. 10 is a drawing showing an example of actual measured values in the fifth embodiment. In the same manner as FIG. 7, FIG. 10 is a graph showing measurement results when synchronous detection is performed while applying dithering to the drive signal bias voltage V$_4$. In the same manner as FIG. 7, the horizontal axis represents the divergence of the voltage V$_{7a}$ from the optimal value. The point at which the horizontal axis is zero indicates that the voltage V$_{7a}$ is at the optimal value. However, unlike the conditions shown in FIG. 7, in the measurement shown in FIG. 10 the voltages V$_{7b}$ and V$_{108}$ are set to values different from the optimal values. That is to say, the quadrature-phase MZ interferometer 2b has not been biased to a null point. Furthermore, in the parent MZI, the phase difference between the output light of the MZ interferometer 2a and the MZ interferometer 2b is in a state that is neither ±π/2 nor −π/2.

In FIG. 10, both filled triangular and open triangular symbols are shown. However, the swing ratios at the time these data were measured are equal to those of the triangular symbols in FIG. 6 and FIG. 7. For both symbols, the value of the voltage V$_{7b}$ is 0 V, and is not the optimal value. The voltage V$_{108}$ is 0 V for the filled triangular symbols, and the voltage V$_{108}$ is Vπ@DC for the open triangular symbols. As mentioned above, for the filled triangular symbols, the phase difference between the output light of the MZ interferometer 2a and the MZ interferometer 2b is neither +π/2 or −π/2. Consequently, for the open triangular symbols, the phase difference between the output light of the MZ interferometer 2a and the MZ interferometer 2b is neither +π/2 nor −π/2.

Firstly, focusing on the filled triangular symbols in FIG. 10. The solid triangular symbols take a minimum value when the voltage V$_{7a}$ is −1.8 V. Next, focusing on the open triangular symbols in FIG. 10. The open triangular symbols take a minimum value when the voltage V$_{7a}$ is +1.8 V. In both cases, the minimum value is obtained if the voltage V$_{7a}$ is different from zero. In other words, in both cases the extreme minimum value does not coincide with the optimal values of the voltage V$_{7a}$. However, when comparing the minimum value of the filled triangular symbols with the minimum value of the open triangular symbols, it is found that they move to positions that symmetrically sandwich the "voltage V$_{7a}$=0 V". This derives from the fact that, by increasing or decreasing the optical phase difference in the parent MZI by π, the direction of the distortion of the constellation changes symmetrically with reference to the optimum shape. Detailed descriptions are described in paragraphs 0051 to 0054 and FIGS. 1 and 2 of a reference document (Japanese Patent Publication No. 5671130).

By utilizing this property, it becomes possible to rapidly lock the in-phase or quadrature-phase bias voltage to the optimal value even if start-up sequence is started from a state in which the parent MZ interferometer phase difference adjustment bias voltage is not optimal. The specific sequence thereof is shown in FIG. 11.

Figure 11:
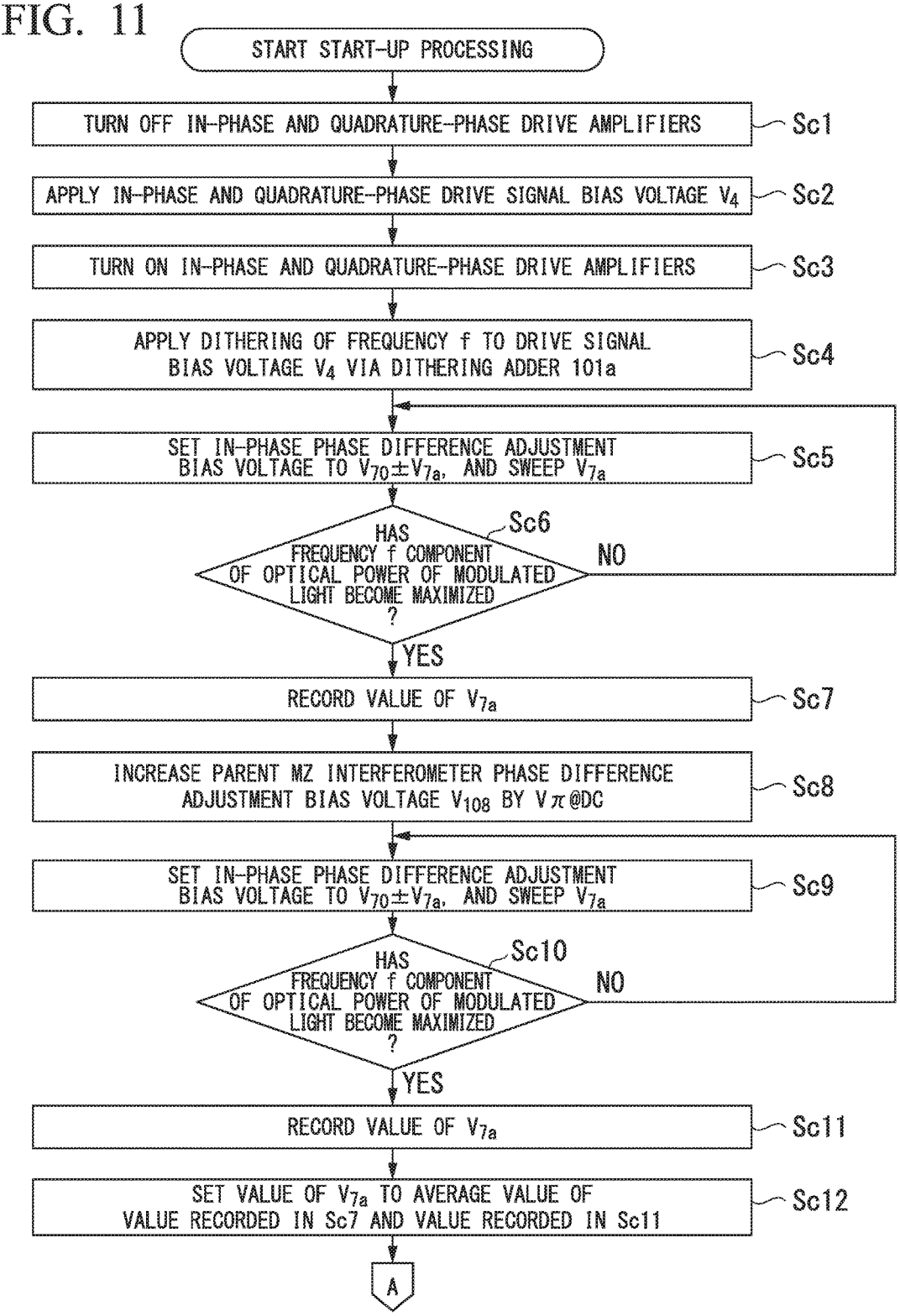
FIG. 11 is a flowchart showing processing that controls a bias voltage according to the fifth embodiment.
Figure 12:
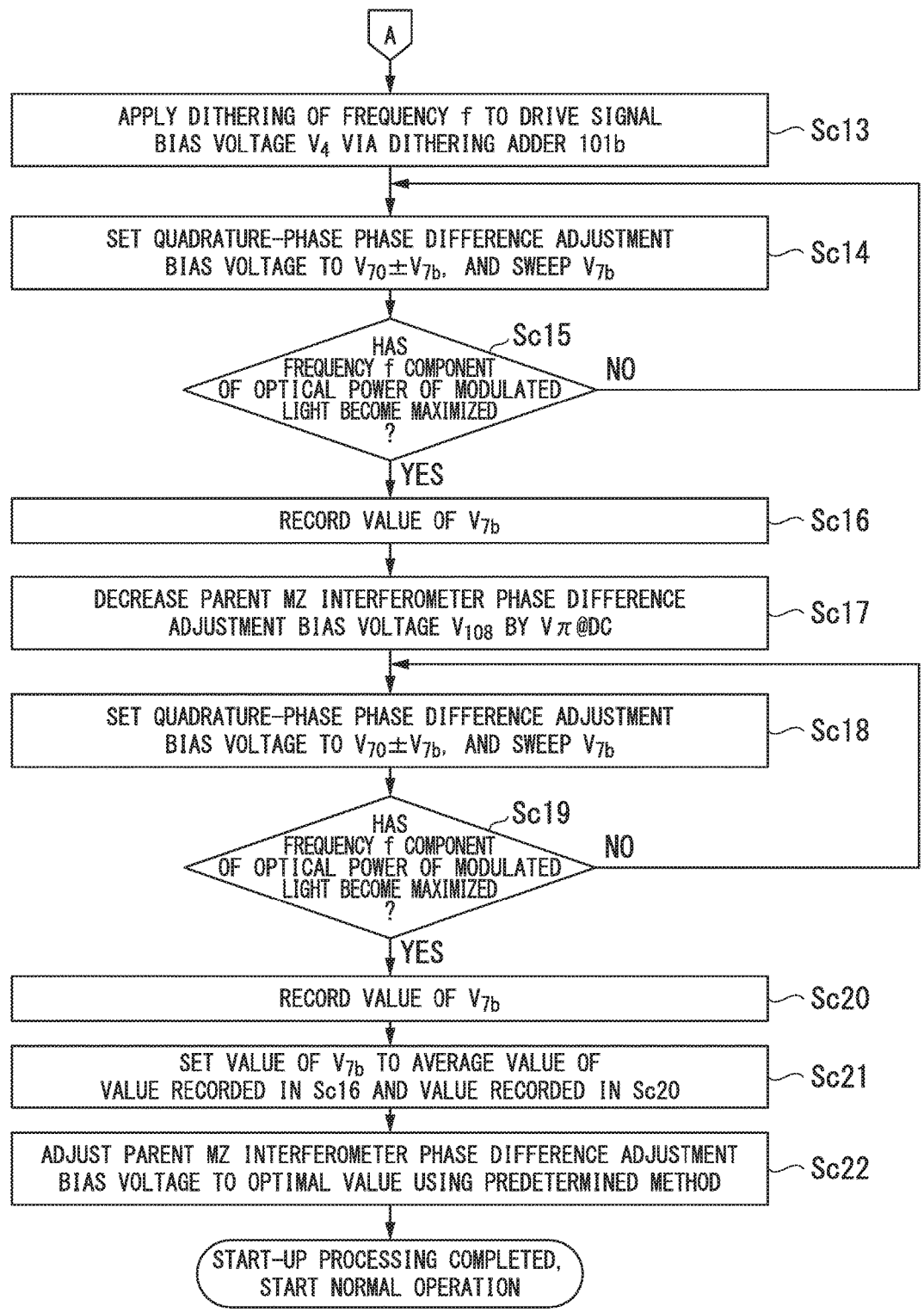
FIG. 12 is a flowchart showing processing that controls a bias voltage according to the fifth embodiment.

FIG. 11 and FIG. 12 are flowcharts showing processing that controls the bias voltage according to the fifth embodiment. The steps Sc1 to Sc3 performed at the beginning of start-up sequence are the same as the steps Sb1 to Sb3 in FIG. 5 and FIG. 9. The steps Sc4 to Sc6 performed next are the same as the steps Sb4a to Sb6a in FIG. 9. In the fifth embodiment, the value of the voltage V$_{7a}$ at which the frequency f component becomes maximized is not immediately employed as the in-phase phase difference adjustment bias voltage, and is recorded as a temporary candidate (step Sc7). Next, the parent MZ interferometer phase difference adjustment bias voltage V$_{108}$ is increased by Vπ@DC. Then, in steps Sc9 to Sc11, the same processing as steps Sc5 to Sc7 is performed. The average value of the two candidate values of the voltage V$_{7a}$ recorded in step Sc7 and step Sc11 is obtained, and the voltage V$_{7a}$ is set to this value (step Sc12).

The voltage value of the voltage $V_{7b}$ is set by performing the same processing with respect to the quadrature-phase phase difference adjustment bias voltage (steps Sc13 to Sc21). However, in order to reduce the range of change of the parent MZ interferometer phase difference adjustment bias voltage $V_{108}$, in step Sc17 it is more desirable to reduce the voltage $V_{108}$ by $V\pi@DC$ rather than increasing it by $V\pi@DC$.

Lastly, in step Sc22, the parent MZ interferometer phase difference adjustment bias voltage $V_{108}$ is optimized in the same manner as step Sb8 in FIG. 9, and start-up sequence is completed.

In the present embodiment, the change amount of the parent MZ interferometer phase difference adjustment bias voltage $V_{108}$ in steps Sc8 and Sc17 was set to $V\pi@DC$, and the average value of the two types of candidate values was taken for the respective voltages $V_{7a}$ and $V_{7b}$. However, it is possible to adopt a configuration in which the change amount of the voltage $V_{108}$ is set to "$V\pi@DC \div n$", and the average value of n+1 types of candidate values is taken for the respective voltages $V_{7a}$ and $V_{7b}$. Here, "n" is a natural number.

Variations of Embodiments

In the embodiments described above, the optical phase difference between the two arms of the MZ interferometer was controlled by push-pull. That is to say, at the same time that a voltage of $V_{70}+V_{7a}$ is applied to the phase difference adjustment bias electrode of one arm, a voltage of $V_{70}-V_{7a}$ is applied to the phase difference adjustment bias electrode of the other arm, and control was performed in a form where if the delay of one increases, the delay of the other decreases. However, a configuration can be adopted in which control is performed for a single phase rather than by push-pull. For example, although a voltage of $V_{70}+V_{7a}$ is applied to the phase difference adjustment bias electrode of one arm, the phase difference adjustment bias electrode of the other arm may be dropped to the ground level. This configuration has the disadvantage that the fluctuation of the optical phase becomes complicated. However it also has the advantage that the device configuration becomes simplified.

Figure 13:
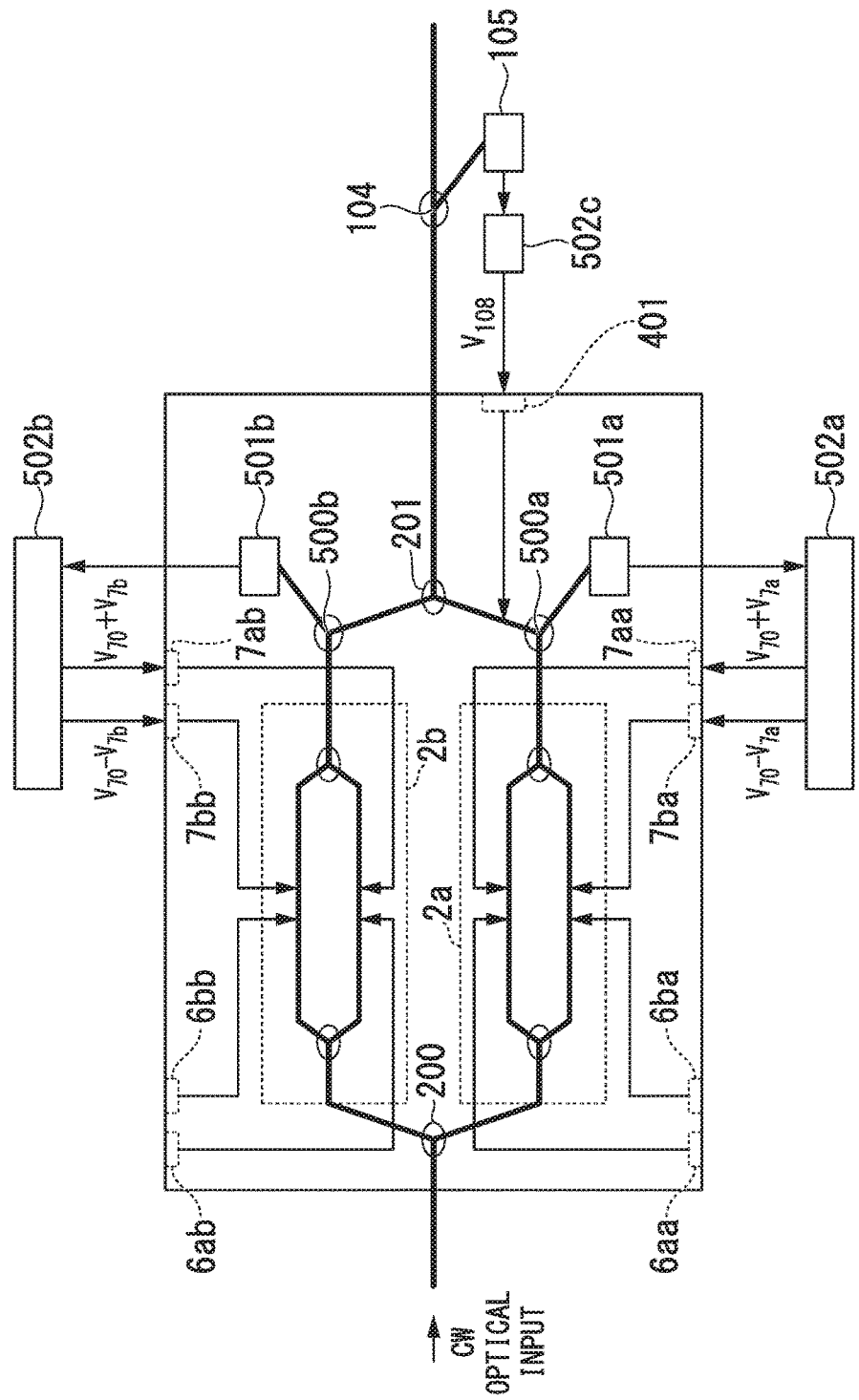
FIG. 13 is a diagram showing a specific example of an IQ modulator according to an embodiment.
Figure 14:
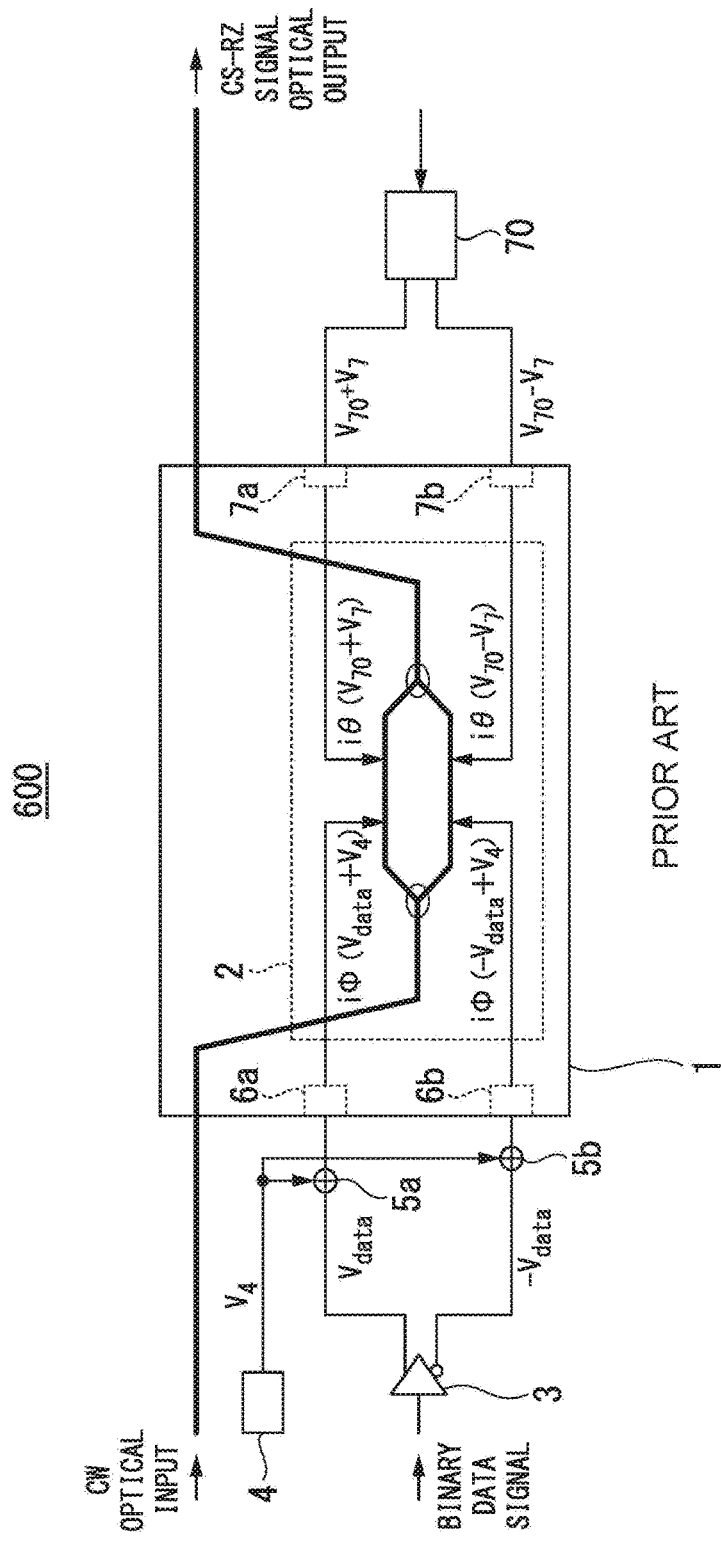
FIG. 14 is a block diagram showing a configuration of a conventional optical transmitter.

Furthermore, the configuration of the IQ modulator shown in FIG. 4 is a standard configuration for commercial products. However, if it is possible to arrange an optical power monitor that separately monitors the respective output of the in-phase MZ interferometer 2a and the quadrature-phase MZ interferometer 2b, a more stable bias control becomes possible. FIG. 13 is a drawing showing a specific example of such an IQ modulator. In FIG. 13, the illustration of the modulator drive system is omitted.

The respective outputs of the in-phase MZ interferometer 2a and the quadrature-phase MZ interferometer 2b are tapped by an in-phase tap unit 500a and a quadrature-phase tap unit 500b. The tapped lights are monitored by an in-phase photodetector 501a and a quadrature photodetector 501b. The monitored optical power is input to an in-phase ABC circuit 502a and a quadrature-phase ABC circuit 502b. The ABC circuits each have circuits equivalent to the synchronous detection circuit 106, the dithering unit 100, and the controller unit 107 shown in FIG. 1. Here, the in-phase MZ interferometer 2a and the quadrature-phase MZ interferometer 2b provided in the IQ modulator are equivalent to the CS-RZ light generation modulator shown in the first embodiment and the second embodiment in the sense that they are biased to a null point and are driven by a push-pull drive signal. Therefore, the in-phase ABC circuit 502a and the quadrature-phase ABC circuit 502b can control the bias of the in-phase MZ interferometer 2a and the quadrature-phase MZ interferometer 2b using the same method as the methods described in the first embodiment and the second embodiment. The parent MZ interferometer phase difference adjustment bias voltage $V_{108}$ is controlled by a parent MZ interferometer ABC circuit 502c. The specific method thereof can be realized for example by the technique described in (Bias Voltage Control Processing According to Third Embodiment) or a well-known technique as described in Non-Patent Document 1.

This configuration has the advantage that even in a state where the parent MZ interferometer phase difference adjustment bias voltage is not optimal, the bias of the in-phase MZ interferometer 2a and the quadrature-phase MZ interferometer 2b can be set to the optimal value without being affected. On the other hand, it has a disadvantage of requiring three power monitors, as well as requiring three independent bias control circuits.

In the embodiments described above, when controlling the bias of the MZ interferometer, the synchronous detection result was assumed to be an extreme value (during child MZI control) or zero (at the time of parent MZI control). However, there is a case where the intensity change of the power monitor built into the modulator does not accurately reflect the intensity change of the modulator output due to structural imperfections of the modulator. In such a case, the value $V_{peak}+V_{offset}$ in which the predetermined fine-tuning offset value $V_{offset}$ is added to the phase difference adjustment bias voltage $V_{peak}$, at which the synchronous detection result becomes an extreme value or zero, may be employed as the phase difference adjustment bias voltage. This can be realized by adding a predetermined numerical value to the synchronous detection result or by setting a feedback loop such that the gradient of the phase difference adjustment bias voltage versus the synchronous detection result becomes a predetermined slope.

The controller units 107, 107-1, and 107a in the embodiments described above may be realized by a computer. In this case, they may be realized by recording a program for realizing the function on a computer-readable recording medium, and causing the computer system to read and execute the program recorded on the recording medium. The "computer system" referred to here is one that includes an OS and hardware such as a peripheral device. Furthermore, the "computer-readable recording medium" refers to a portable storage medium such as a flexible disk, a magneto-optical disk, a ROM and a CD-ROM, or a recording device such as a hard disk built into the computer system. In addition, the "computer-readable recording medium" may include those that dynamically retain the program for a short time, such as a communication line that transmits the program via a network such as the Internet or a communication line such as a telephone line, and those that retain the program for a fixed time, such as the volatile memory inside a computer system serving as a server or a client in this case. Moreover, the program described above may be one that realizes a portion of the functions mentioned above. Further, the program may be one capable of realizing the functions described above in combination with a program already recorded in the computer system, or may be realized using a programmable logic device, such as an FPGA (Field Programmable Gate Array).

Although embodiment of the present invention have been described above in detail with reference to the drawings, the specific configuration is in no way limited to these embodiments, and designs and the like within a scope not deviating from the gist of the present invention are also included.

INDUSTRIAL APPLICABILITY

The present invention may be applied to an optical transmitter and a bias voltage control method.

REFERENCE SYMBOLS

1 Semiconductor optical modulator
2 MZ interferometer
3 Drive amplifier
4 Drive signal bias voltage generator
5a, 5b Bias adder
6a, 6b Drive signal input electrode
70 Phase difference adjustment bias voltage generator
7a, 7b Phase difference adjustment bias electrode
100 Dithering unit
101 Dithering adder
104 Tap unit
105 Photodetector
106 Synchronous detection circuit
107 Controller unit
300, 301, 302, 310, 311 Optical waveguide

The invention claimed is:

1. An optical transmitter comprising:
an optical modulator comprising
a Mach-Zehnder (MZ) interferometer that comprises two optical waveguides,
a drive signal input electrode that applies a drive signal that changes an optical phase of two optical signals, the two optical signals respectively propagating through the two optical waveguides, and
a phase difference adjustment bias electrode that applies a phase difference adjustment bias voltage, the phase difference adjustment bias voltage adjusting the optical phase difference of the two signals by changing the optical phase of the two optical signals;
a drive amplifier that generates the drive signal and applies it to the drive signal input electrode;
a phase difference adjustment bias voltage generator that generates the phase difference adjustment bias voltage and applies it to the phase difference adjustment bias electrode;
a dithering unit that applies dithering of a predetermined frequency to an amplitude of the drive signal or to a half-wave voltage of the MZ interferometer;
a controller unit that changes the phase difference adjustment bias voltage generated by the phase difference adjustment bias voltage generator based on an intensity modulation component of the frequency that is superimposed onto modulated light that is output from the optical modulator, to thereby bias the MZ interferometer to a null point;
a photodetector that receives the modulated light that is output from the optical modulator and converts it into an electric signal; and
a synchronous detection circuit that synchronously detects the intensity modulation component of the frequency that is superimposed onto the converted electric signal,
wherein the controller unit changes the phase difference adjustment bias voltage generated by the phase difference adjustment bias voltage generator such that a result of synchronous detection by the synchronous detection circuit becomes maximized or minimized, to thereby bias the MZ interferometer to the null point, and
whether the controller unit maximizes or minimizes the result of synchronous detection is determined by a difference between a phase of a referenced clock signal and a phase of the dithering, and does not depend on the amplitude of the drive signal.

2. The optical transmitter according to claim 1,
wherein the optical modulator is an IQ modulator,
the MZ interferometer comprises an in-phase MZ interferometer and a quadrature-phase MZ interferometer,
the drive signal input electrode comprises a drive signal input electrode associated with the in-phase MZ interferometer, and a drive signal input electrode associated with the quadrature-phase MZ interferometer,
the phase difference adjustment bias electrode comprises a phase difference adjustment bias electrode associated with the in-phase MZ interferometer, and a phase difference adjustment bias electrode associated with the quadrature-phase MZ interferometer,
the drive amplifier comprises a drive amplifier provided for the in-phase MZ interferometer, and a drive amplifier provided for the quadrature-phase MZ interferometer,
the phase difference adjustment bias voltage generator comprises a phase difference adjustment bias voltage generator provided for the in-phase MZ interferometer, and a phase difference adjustment bias voltage generator provided for the quadrature-phase MZ interferometer, and
the controller unit, based on the intensity modulation component of the frequency that is superimposed onto the modulated light that is output from the IQ modulator, changes a phase difference adjustment bias voltage applied by the phase difference adjustment bias voltage generator provided for the in-phase MZ interferometer, and a phase difference adjustment bias voltage applied by the phase difference adjustment bias voltage generator provided for the quadrature-phase MZ interferometer, to thereby bias each of the in-phase MZ interferometer and the quadrature-phase MZ interferometer to a null point.

3. The optical transmitter according to claim 2, wherein the dithering unit performs control such that, with respect to an amplitude of a drive signal or a half-wave voltage of the in-phase MZ interferometer and the quadrature-phase MZ interferometer comprised in the IQ modulator, at a time dithering is being applied to one of the in-phase MZ interferometer or the quadrature-phase MZ interferometer, dithering is not applied to the other of the in-phase MZ interferometer and the quadrature-phase MZ interferometer.

4. The optical transmitter according to claim 2, wherein the dithering unit applies dithering of a different frequency or a different phase with respect to an amplitude of a drive signal or a half-wave voltage of the in-phase MZ interferometer and the quadrature-phase MZ interferometer comprised in the IQ modulator.

5. The optical transmitter according to claim 2,
wherein the controller unit has a function that changes, during a start-up sequence of the IQ modulator, a phase difference of two light signals being an output light of the in-phase MZ interferometer and an output light of the quadrature-phase MZ interferometer, n times (where n is a natural number), and
the controller unit records as a candidate value the phase difference adjustment bias voltage at which a result of synchronous detection by the synchronous detection circuit becomes maximized or minimized, each of n times the change is performed, and employs an average value of the obtained n types of candidate values as the phase difference adjustment bias voltage.

6. The optical transmitter according to claim 2, wherein the controller unit sets the phase difference adjustment bias voltage so as to be a voltage Vpeak+Voffset, in which a predetermined fine-tuning offset value Voffset is added to a phase difference adjustment bias voltage Vpeak at which a synchronous detection result obtained by the synchronous detection circuit becomes an extreme value or zero.

7. The optical transmitter according to claim 1, wherein the dithering unit applies the dithering by changing a gain of the drive amplifier at a time dithering of the frequency is applied to an amplitude of the drive signal.

8. The optical transmitter according to claim 1, further comprising:
a drive signal bias voltage generator that generates and outputs a drive signal bias voltage that biases the drive signal,
wherein the dithering unit applies the dithering by changing the drive signal bias voltage at a time dithering is applied to a half-wave voltage of the MZ interferometer.

9. The optical transmitter according to claim 1, wherein the controller unit, at a time of start-up, sets an amplitude of the drive signal to be smaller than an amplitude in a normal operation state.

10. The optical transmitter according to claim 1, wherein the controller unit, at a time of start-up, sets a half-wave voltage of the MZ interferometer to be larger than that in a normal operation state.

11. A method for controlling a bias voltage in an optical transmitter, the optical transmitter comprising an optical modulator comprising a Mach-Zehnder (MZ) interferometer comprising two optical waveguides, the method comprising the steps of:
applying a drive signal that changes an optical phase of two optical signals, the two optical signals respectively propagating through the two optical waveguides;
applying a phase difference adjustment bias voltage, the phase difference adjustment bias voltage adjusting the optical phase difference of the two signals by changing the optical phase of the two optical signals;
applying dithering of a predetermined frequency to an amplitude of the drive signal or to a half-wave voltage of the MZ interferometer;
changing the phase difference adjustment bias voltage based on an intensity modulation component of the frequency that is superimposed onto modulated light that is output from the optical modulator, to thereby bias the MZ interferometer to a null point;
receiving the modulated light that is output from the optical modulator and converting it into an electric signal; and
synchronously detecting the intensity modulation component of the frequency that is superimposed onto the converted electric signal,
wherein the step of biasing comprises the step of changing the phase difference adjustment bias voltage such that a result of synchronous detection becomes maximized or minimized, to thereby bias the MZ interferometer to the null point, and
whether the result of synchronous detection is maximized or minimized is determined by a difference between a phase of a referenced clock signal and a phase of the dithering, and does not depend on the amplitude of the drive signal.

* * * * *